(12) United States Patent
Nakajima et al.

(10) Patent No.: US 8,755,077 B2
(45) Date of Patent: Jun. 17, 2014

(54) DEVICE INFORMATION PROVIDING SYSTEM FOR PROVIDING INFORMATION THROUGH A WEB PAGE INCLUDED IN EACH OF A MAIN ELECTRONIC DEVICE AND A SUB-ELECTRONIC DEVICE

(71) Applicant: KYOCERA Document Solutions Inc., Osaka (JP)

(72) Inventors: Koki Nakajima, Osaka (JP); Takeshi Nakamura, Osaka (JP); Kensaku Sugimoto, Osaka (JP); Koji Sasadai, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 13/779,375

(22) Filed: Feb. 27, 2013

(65) Prior Publication Data

US 2013/0222849 A1 Aug. 29, 2013

(30) Foreign Application Priority Data

Feb. 29, 2012 (JP) ................................. 2012-044379

(51) Int. Cl.
 *G06F 15/00* (2006.01)
(52) U.S. Cl.
 USPC ........................................................ 358/1.15
(58) Field of Classification Search
 CPC ........................... G06F 3/1287; H04N 1/00222
 See application file for complete search history.

(56) References Cited

U.S. PATENT DOCUMENTS

| | | |
|---|---|---|
| 6,587,880 B1 | 7/2003 | Saigo et al. |
| 6,654,796 B1 | 11/2003 | Slater et al. |
| 2003/0030664 A1 | 2/2003 | Parry |
| 2003/0055888 A1 | 3/2003 | Matsumoto et al. |
| 2005/0180793 A1 | 8/2005 | Nishiguchi |
| 2009/0257085 A1* | 10/2009 | Kondo ................... 358/1.15 |
| 2011/0060925 A1 | 3/2011 | Park |

FOREIGN PATENT DOCUMENTS

EP 0903675 A1 3/1999

(Continued)

OTHER PUBLICATIONS

European Search Report for App. No. EP 13157068.1, mailed Nov. 8, 2013.

*Primary Examiner* — Saeid Ebrahimi Dehkordy
(74) *Attorney, Agent, or Firm* — McDonnell Boehnen Hulbert & Berghoff LLP

(57) ABSTRACT

A device information providing system includes a main electronic device including: a main-side external communication unit configured to communicate with an information processing device; a main-side inter-device communication unit configured to communicate with a sub-electronic device; a main-side HTTP server configured to provide a main-side page including a Web page of the main electronic device; and a main-side communication control unit configured to: (i) disconnect a main-side normal connection when a connection to a sub-side switching URL is requested by the information processing device while the main-side normal connection is established, and (ii) establish a main-side transfer connection. The sub-electronic device includes: the sub-side inter-device communication unit configured to communicate with the main-side inter-device communication unit and the sub-side HTTP server configured to provide a sub-side page to which the sub-side switching URL used to switch the connection assigned, the sub-side page including a Web page of the sub-electronic device.

20 Claims, 18 Drawing Sheets

(56) References Cited

FOREIGN PATENT DOCUMENTS

| JP | 11-212912 | 8/1999 |
| JP | 2003-067267 | 3/2003 |
| JP | 2003-131856 | 5/2003 |
| JP | 2003-330824 | 11/2003 |
| JP | 2009-219052 | 9/2009 |
| JP | 2009-223608 | 10/2009 |

* cited by examiner

# DEVICE INFORMATION PROVIDING SYSTEM FOR PROVIDING INFORMATION THROUGH A WEB PAGE INCLUDED IN EACH OF A MAIN ELECTRONIC DEVICE AND A SUB-ELECTRONIC DEVICE

REFERENCE TO RELATED APPLICATIONS

This application is based upon and claims the benefit of priority from the corresponding Japanese Patent Application No. 2012-044379, filed in the Japan Patent Office on Feb. 29, 2012, the entire contents of which are incorporated herein by reference.

FIELD

The present disclosure relates to a device information providing system for providing information through a Web page included in each of a main electronic device and a sub-electronic device.

BACKGROUND

A typical device information providing system includes a network card unit and a printing unit that are connected to each other. The network card unit includes a network I/F unit for communicating with a host computer, a printing device I/F unit for communicating with the printing unit, a device-independent content unit for providing Web content of the network card unit, and a WWW server unit for controlling communications. The printing unit includes a network card I/F unit for communicating with the printing device I/F unit and a device-dependent content unit for providing Web content of the printing unit. The WWW server unit passes the Web content to the host computer from the device-independent content unit or the device-dependent content unit in response to a request received from the host computer while a connection is established with respect to the host computer via the network I/F unit.

In the typical device information providing system, the network card unit, which includes a Web server that has established a connection with respect to an information processing device, acquires the Web content of the printing unit. Accordingly, if there is a change in a combination of the network card unit and the printing unit due to a model change or a change in product specifications, the network card unit may fail to acquire the Web content of the printing unit.

SUMMARY

A device information providing system according to an embodiment of the present disclosure includes a main electronic device and a sub-electronic device. The main electronic device includes a main-side external communication unit, a main-side inter-device communication unit, a main-side HTTP server, and a main-side communication control unit. The main-side external communication unit is configured to communicate with an information processing device. The main-side HTTP server is configured to provide a main-side page including a Web page of the main electronic device. The main-side communication control unit is configured to: (i) disconnect a main-side normal connection between the information processing device and the main-side HTTP server via the main-side external communication unit when a connection to a sub-side switching URL is requested by the information processing device while the main-side normal connection is established, (ii) and establish a main-side transfer connection between the information processing device and a sub-side HTTP server via the main-side external communication unit, the main-side inter-device communication unit, and a sub-side inter-device communication unit. The sub-electronic device is connected to the main electronic device, and includes the sub-side inter-device communication unit and the sub-side HTTP server. The sub-side inter-device communication unit is configured to communicate with the main-side inter-device communication unit. The sub-side HTTP server is configured to provide a sub-side page to which the sub-side switching URL used to switch the connection is assigned, the sub-side page comprising a Web page of the sub-electronic device. The main-side inter-device communication unit is configured to communicate with the sub-electronic device.

An electronic device according to an embodiment of the present disclosure includes a main-side external communication unit, a main-side inter-device communication unit, a main-side HTTP server, a main-side communication control unit, and an interface. The main-side external communication unit is configured to communicate with an information processing device. The main-side inter-device communication unit is configured to communicate with a sub-electronic device. The main-side HTTP server is configured to provide a main-side page including a Web page of the electronic device. The main-side communication control unit is configured to: (i) disconnect a main-side normal connection that is a connection between the information processing device and the main-side HTTP server via the main-side external communication unit when a connection to a sub-side switching URL is requested by the information processing device while the main-side normal connection is established, and (ii) establish a main-side transfer connection that is a connection between the information processing device and a sub-side HTTP server via the main-side external communication unit, the main-side inter-device communication unit, and a sub-side inter-device communication unit. The interface is configured to be connected to the sub-electronic device including the sub-side inter-device communication unit configured to communicate with the main-side inter-device communication unit and the sub-side HTTP server configured to provide a sub-side page to which the sub-side switching URL used to switch the connection is assigned, the sub-side page including a Web page of the sub-electronic device.

A non-transitory computer-readable recording medium according to an embodiment of the present disclosure stores a device information providing program executed by a computer of an electronic device connected to a sub-electronic device. The device information providing program includes five program codes. A first program code causes the computer to communicate with an information processing device via a main-side external communication unit. A second program code causes the computer to communicate with the sub-electronic device via a main-side inter-device communication unit. A third program code causes the computer to provide a main-side page including a Web page of the electronic device via a main-side HTTP server. A fourth program code causes, via a main-side communication control unit, the computer to disconnect a main-side normal connection that is a connection between the information processing device and the main-side HTTP server via the main-side external communication unit when a connection to a sub-side switching URL is requested by the information processing device while the main-side normal connection is established, and establish a main-side transfer connection that is a connection between the information processing device and a sub-side HTTP server via the main-side external communication unit, the main-side inter-device communication unit, and a sub-side inter-device communication unit. A fifth program code causes, via an interface connected to the sub-electronic device, the computer to be connected to the sub-electronic device including: the sub-side inter-device communication unit for communicating with the main-side inter-device communication unit; and the sub-side HTTP server for providing a sub-side page to which the sub-side switching URL used to switch the connection is assigned, the sub-side page including a Web page of the sub-electronic device.

Additional features and advantages are described herein, and will be apparent from the following Detailed Description and the figures.

DETAILED DESCRIPTION

An embodiment of the present disclosure is now described with reference to the accompanying drawings.

Figure 1:
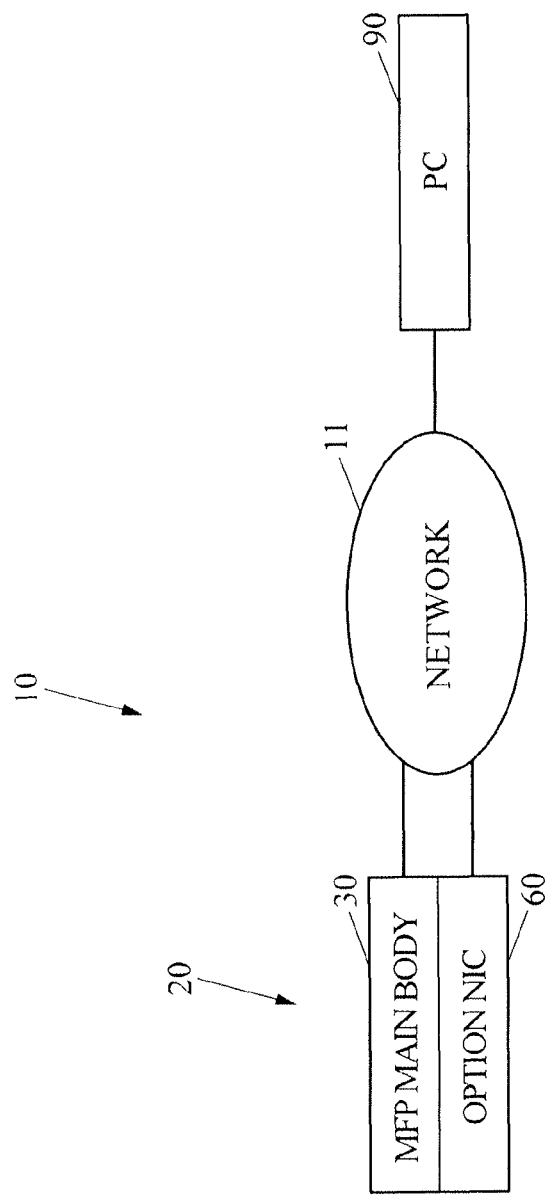
FIG. 1 illustrates a configuration of a network system, according to an embodiment of the present disclosure.

FIG. 1 illustrates an example configuration of a network system according to an embodiment of the present disclosure.

As illustrated in FIG. 1, network system 10 includes multifunction peripheral (MFP) 20 and personal computer (PC) 90, an information processing device external to MFP 20.

MFP 20 includes MFP main body 30 that serves as an image forming apparatus and an option network interface card (Option NIC) 60. Option NIC 60 is a network interface card detachably attachable to MFP main body 30. MFP main body 30 and Option NIC 60 are connected to each other.

MFP 20 and PC 90 are communicably connected to each other via network 11 such as a local area network (LAN).

Figure 2:
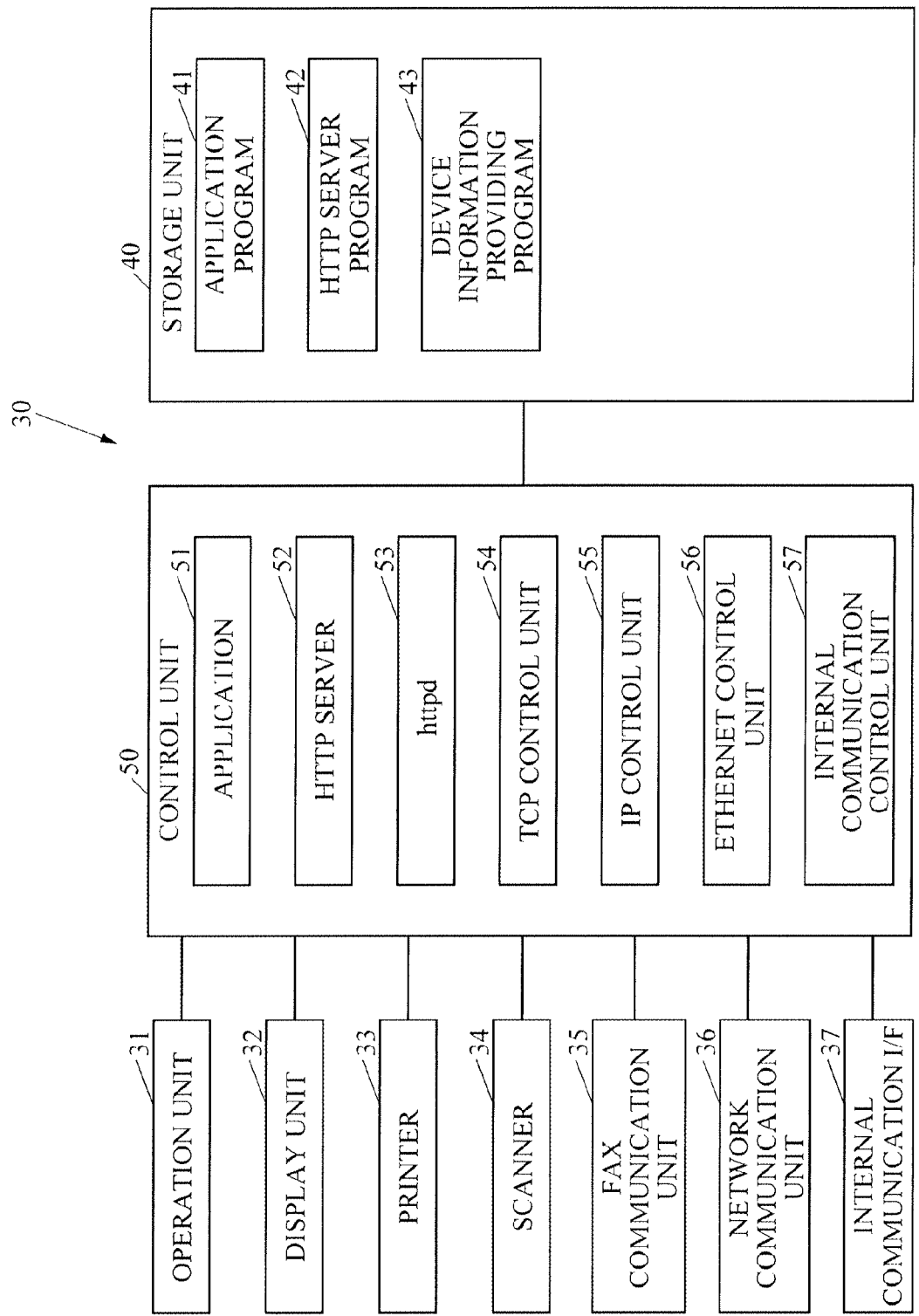
FIG. 2 illustrates a configuration of an MFP main body, according to an embodiment of the present disclosure.

FIG. 2 illustrates a configuration of the MFP main body according to the embodiment of the present disclosure.

As illustrated in FIG. 2, MFP main body 30 includes an operation unit 31 that may include input devices such as buttons through which various operations may be input by a user, display unit 32 that may include a display device such as a liquid crystal display (LCD) for displaying various kinds of information, printer 33 that may include a printing device for executing printing of an image on a recording medium such as paper, scanner 34 that may include a reading device for reading an image from an original, FAX communication unit 35 including a FAX device for performing FAX communications through a communication line such as a public telephone line, network communication unit 36 that may include a communication device for performing communications through network 11, internal communication I/F 37 serving as an inter-device communication unit for communicating with Option NIC 60, storage unit 40 that may include a storage device such as an electrically erasable programmable read only memory (EEPROM) or a hard disk drive (HDD) for storing different kinds of data, and control unit 50 for controlling an entirety of MFP main body 30.

Network communication unit 36 may be an external communication unit for communicating with a PC, and may, for example, be used for wired communications.

Storage unit 40 stores application program 41 for generating a Web page for a setting menu (hereinafter referred to as "MFP main body setting Web page") necessary to set different functions of MFP main body 30, HTTP server program 42 used as a hypertext transfer protocol (HTTP) server for providing the MFP main body setting Web page, and device information providing program 43 for providing device information.

The MFP main body setting Web page includes a Web page for setting of MFP main body 30. An MFP main body-side normal URL accessed via network communication unit 36 and an MFP main body-side switching URL used to switch the connection are assigned to the MFP main body setting Web page. The MFP main body-side normal URL and the MFP main body-side switching URL may be, for example, "http://mfp_ip/" and "http://mfp_ip/mfp", respectively. Note that "mfp_ip" indicates an IP address of MFP main body 30.

Application program 41, HTTP server program 42, and device information providing program 43 may be installed in MFP main body 30 at a manufacturing stage of MFP main body 30, installed in MFP main body 30 from a storage medium such as a universal serial bus (USB) memory or an SD memory card, or may be installed in MFP main body 30 from network 11.

Control unit 50 may include, for example, a central processing unit (CPU), a read only memory (ROM) for storing a program and different kinds of data, and a random access memory (RAM) used as a work area for the CPU (none of which are shown in FIG. 2). The CPU is configured to execute the program stored in the ROM or storage unit 40.

Control unit 50 executes application program 41 stored in storage unit 40, thereby functioning as application 51 for generating the MFP main body setting Web page.

Further, control unit 50 executes HTTP server program 42 stored in storage unit 40, thereby functioning as HTTP server 52 for providing the MFP main body setting Web page.

Further, control unit 50 executes device information providing program 43 stored in storage unit 40, thereby functioning as hypertext transfer protocol daemon (httpd) 53 that serves as a communication control unit. Httpd 53 can switch between (i) an MFP main body-side normal connection, between the PC and HTTP server 52, via network communication unit 36 and (ii) an MFP main body-side transfer connection, between the PC and an HTTP server of an Option NIC (described later), via network communication unit 36, internal communication I/F 37, and internal communication I/F 62 of Option NIC 60.

Further, control unit 50 executes the program stored in storage unit 40, thereby functioning as TCP control unit 54 for controlling transmission control protocol (TCP) communications, IP control unit 55 for controlling Internet protocol (IP) communications, Ethernet control unit 56 for controlling Ethernet® communications, and internal communication control unit 57 for controlling communications performed by internal communication I/F 37.

Figure 3:
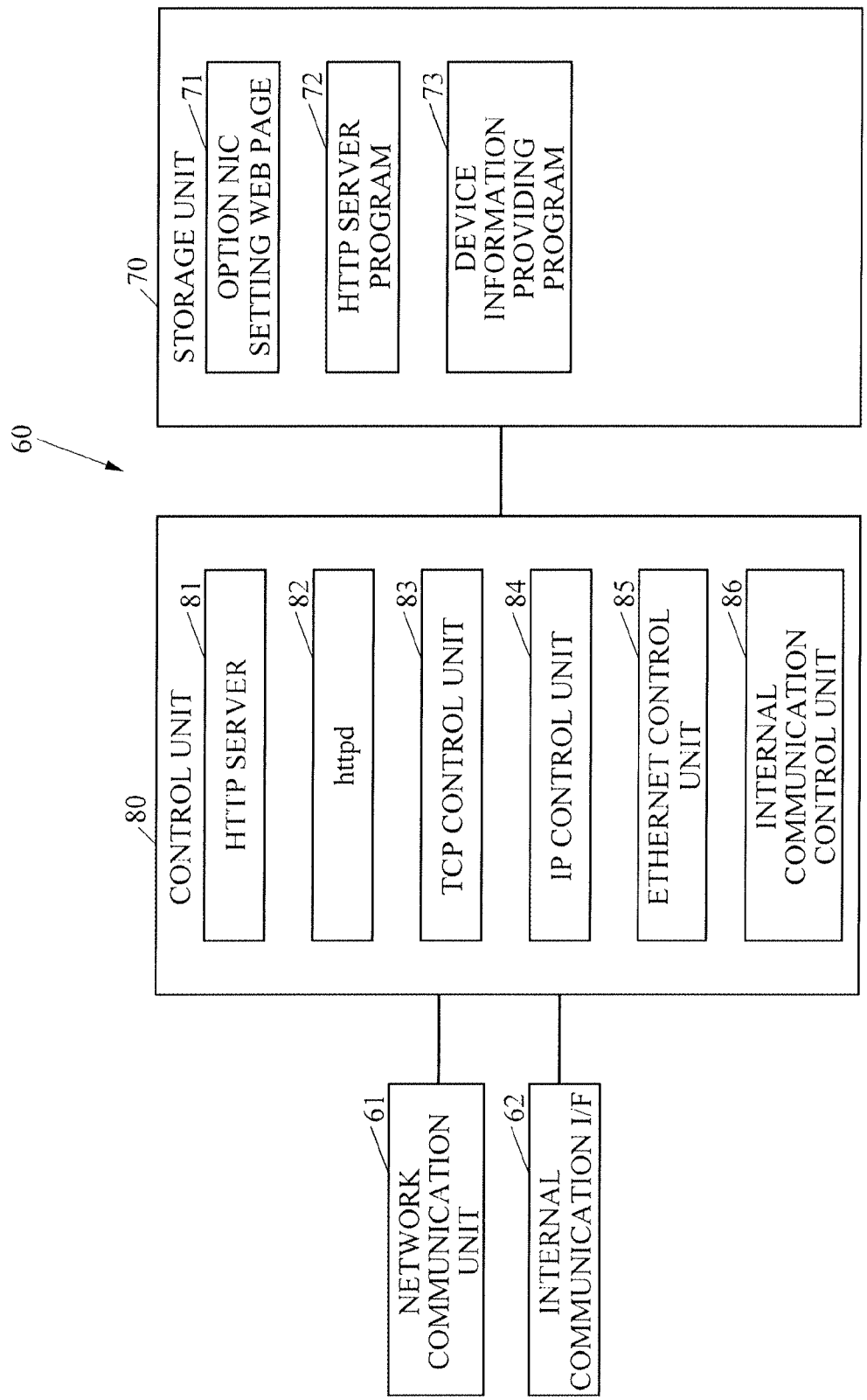
FIG. 3 illustrates a configuration of an Option NIC, according to an embodiment of the present disclosure.

FIG. 3 illustrates a configuration of the Option NIC according to the embodiment of the present disclosure.

As illustrated in FIG. 3, Option NIC 60 includes network communication unit 61 that may include a network communication device for performing communications through network 11, internal communication I/F 62 for communicating with an internal communication I/F of the MFP main body, storage unit 70 that may include a storage device such as an EEPROM for storing different kinds of data, and control unit 80 for controlling Option NIC 60.

Network communication unit 61 may be an external communication unit for communicating with PC 90, and may be used for wireless communications.

Storage unit 70 stores Option NIC setting Web page 71 including a Web page for a setting menu necessary to set different functions of Option NIC 60 such as a print server function, HTTP server program 72 that may include a program for the HTTP server for providing Option NIC setting Web page 71, and device information providing program 73 for providing device information.

Option NIC setting Web page 71 includes a Web page for network setting of Option NIC 60. An Option NIC-side normal URL accessed via network communication unit 61 and an Option NIC-side switching URL used to switch the connection are assigned to Option NIC setting Web page 71. The Option NIC-side normal URL and the Option NIC-side switching URL are, for example, "http://option_nic_ip/" and "http://option_nic_ip/option_nic", respectively. Note that "option_nic_ip" indicates an IP address of Option NIC 60.

HTTP server program 72 and device information providing program 73 may be installed in Option NIC 60 at a manufacturing stage of Option NIC 60 or installed in Option NIC 60 from network 11.

Control unit 80 includes, for example, a CPU, a ROM for storing a program and different kinds of data, and a RAM used as a work area for the CPU (none of which are shown in FIG. 3). The CPU is configured to execute the program stored in the ROM or storage unit 70.

Control unit 80 executes HTTP server program 72 stored in storage unit 70, thereby functioning as HTTP server 81 for providing Option NIC setting Web page 71.

Further, control unit 80 executes device information providing program 73 stored in storage unit 70, thereby functioning as httpd 82 that serves as a communication control unit. Httpd 82 can switch between (i) an Option NIC-side normal connection, between PC 90 and HTTP server 81, via network communication unit 61 and (ii) an Option NIC-side transfer connection, between PC 90 and the HTTP server of the MFP main body, via network communication unit 61, internal communication I/F 62, and internal communication I/F 37 of MFP main body 30.

Further, control unit 80 executes the program stored in storage unit 70, thereby functioning as TCP control unit 83 for controlling TCP communications, IP control unit 84 for controlling IP communications, Ethernet control unit 85 for controlling Ethernet® communications, and internal communication control unit for controlling communications performed by internal communication I/F 62.

Figure 4:
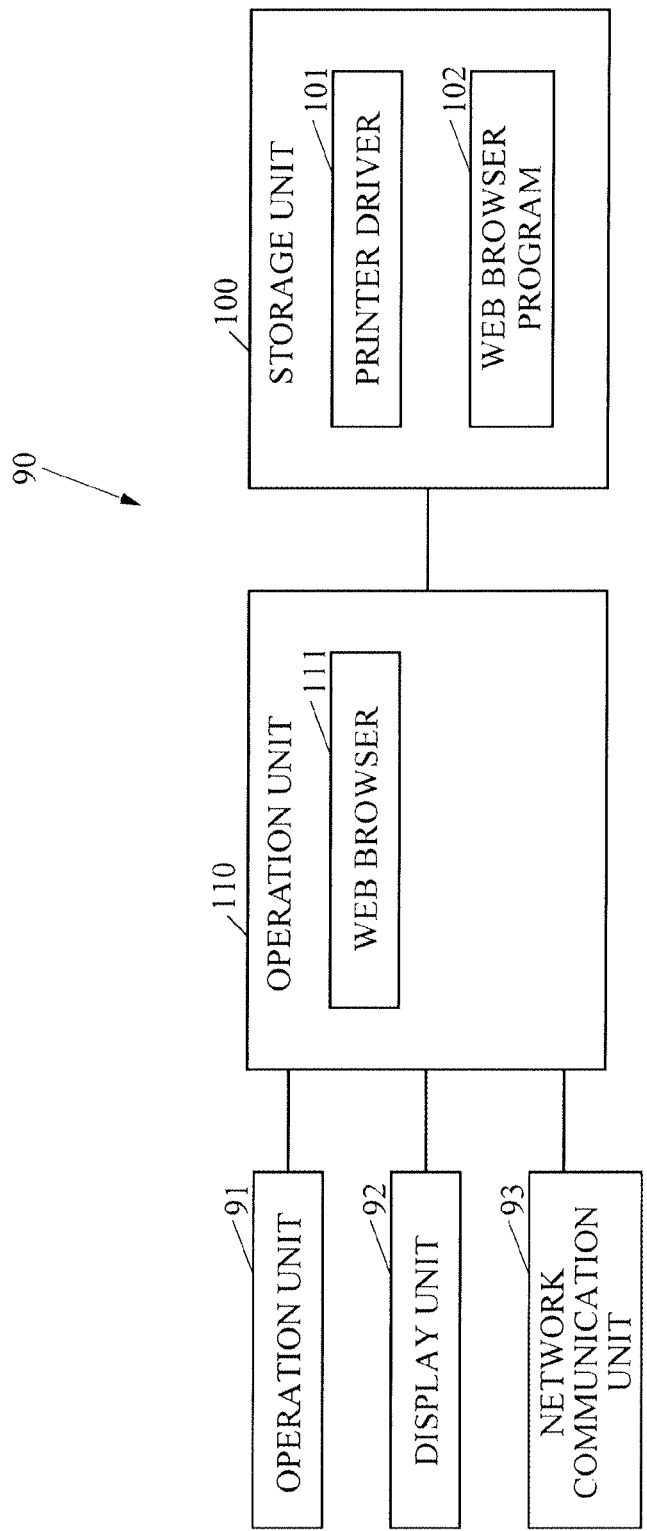
FIG. 4 illustrates a configuration of a PC, according to the embodiment of the present disclosure.

FIG. 4 illustrates a configuration of the PC according to the embodiment of the present disclosure.

As illustrated in FIG. 4, PC 90 includes operation unit 91 that may include input devices such as a mouse and a keyboard through which various operations may be input by a user, display unit 92 that may include a display device such as an LCD for displaying various kinds of information, network communication unit 93 that may include a network communication device for performing communications through network 11, storage unit 100 that may include a storage device such as an HDD for storing different kinds of data, and control unit 110 for controlling PC 90.

Storage unit 100 stores printer driver 101 for controlling printing performed on MFP 20 and Web browser program 102 used for a Web browser for browsing Web pages.

Printer driver 101 and Web browser program 102 may be installed in PC 90 at a manufacturing stage of PC 90, installed in PC 90 from a storage medium such as a USB memory, a compact disc (CD), or a digital versatile disc (DVD), or installed in PC 90 from network 11.

Control unit 110 includes, for example, a CPU, a ROM for storing a program and different kinds of data, and a RAM used as a work area for the CPU (none of which are shown in FIG. 4). The CPU is configured to execute the program stored in the ROM or storage unit 100.

Control unit 110 executes Web browser program 102 stored in storage unit 100, thereby functioning as Web browser 111 for browsing Web pages.

Next, a description is made of an operation of network system 10.

First, described are example communications that may be performed between an MFP and the PC via a network communication unit of the MFP main body.

Figure 5:
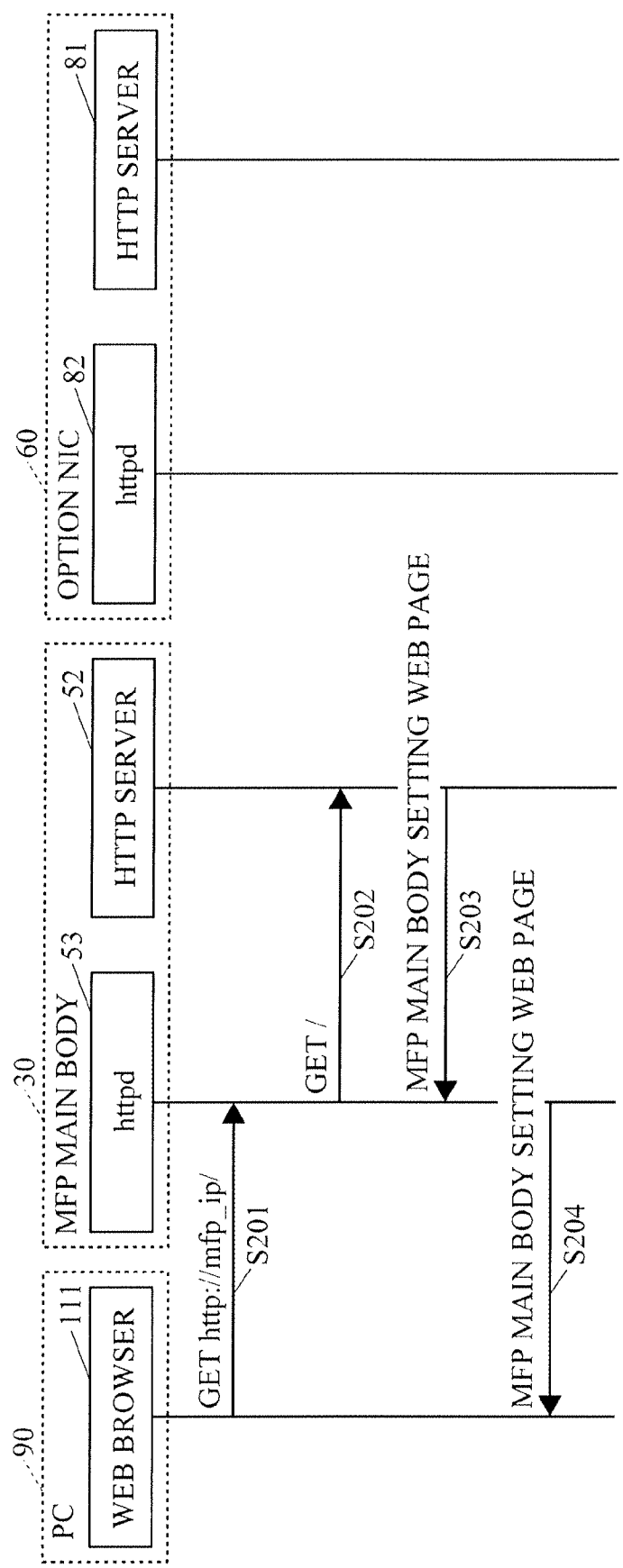
FIG. 5 illustrates an example operation of the network system of FIG. 1 performed to establish an MFP main body-side normal connection, according to an embodiment of the present disclosure.

FIG. 5 illustrates an example operation of network system 10 performed to establish the MFP main body-side normal connection. The example of FIG. 5 relates to the operation of network system 10 performed when a user inputs the IP address of MFP main body 30 to the Web browser through an operation unit of PC 90.

If the user activates Web browser 111 through operation unit 91 of PC 90 and inputs the IP address "mfp_ip" of MFP main body 30 to Web browser 111, Web browser 111 transmits a GET request to "http://mfp_ip/" (S201).

Figure 6:
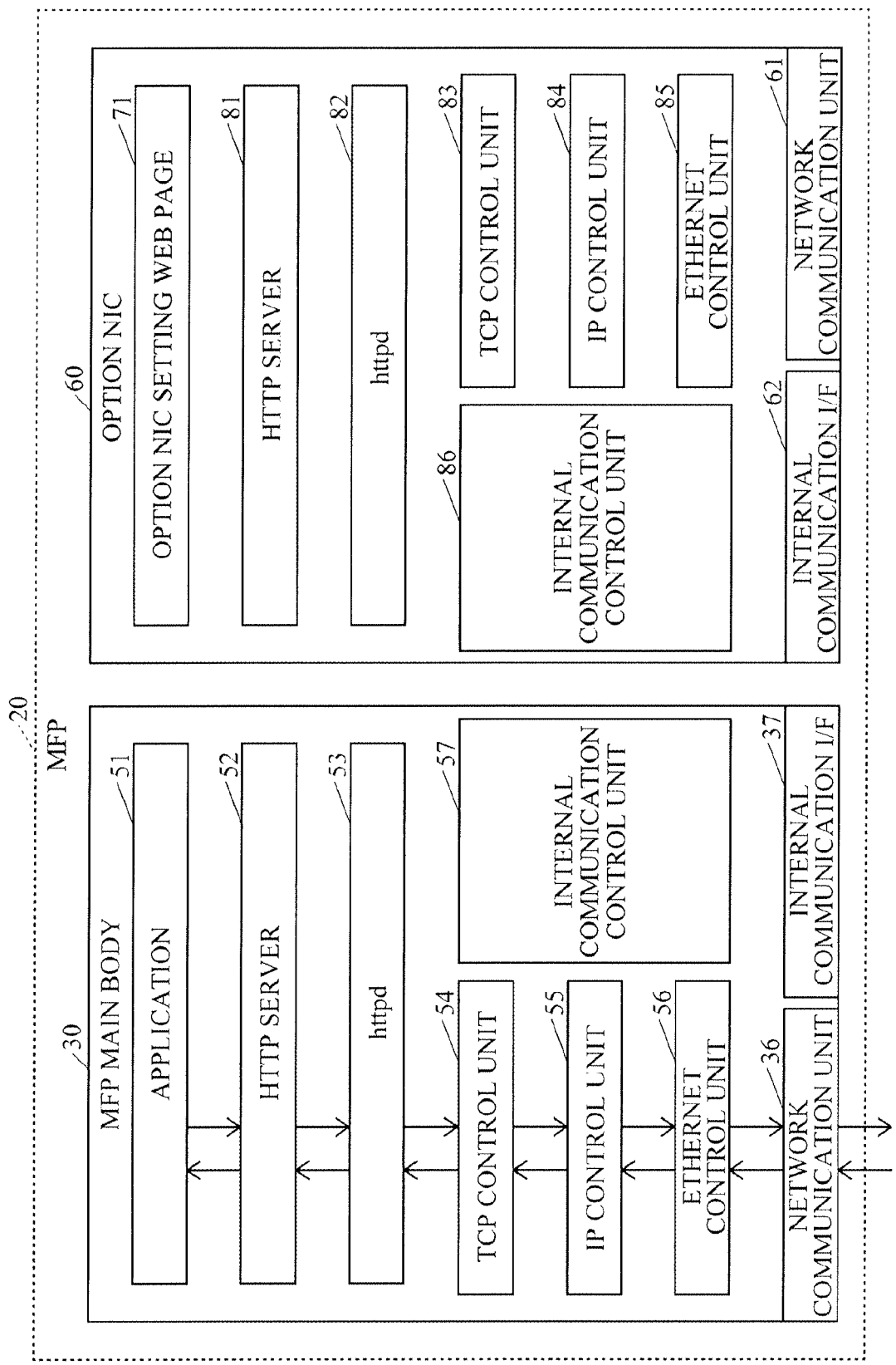
FIG. 6 illustrates a flow of information within an MFP obtained while the MFP main body-side normal connection is established, according to an embodiment of the present disclosure.

FIG. 6 illustrates a flow of information within the MFP obtained while the MFP main body-side normal connection is established.

When Web browser 111 transmits the GET request to "http://mfp_ip/" in Step S201, the GET request is received by the network communication unit of MFP main body 30 corresponding to the IP address "mfp_ip". As illustrated in FIG. 6, the GET request is transferred to httpd 53 via Ethernet control unit 56, IP control unit 55, and TCP control unit 54, sequentially. Httpd 53 of MFP main body 30 determines a transfer destination of the GET request, as illustrated in FIG. 7, based on a URL of the GET request transferred from TCP control unit 54.

Figure 7:
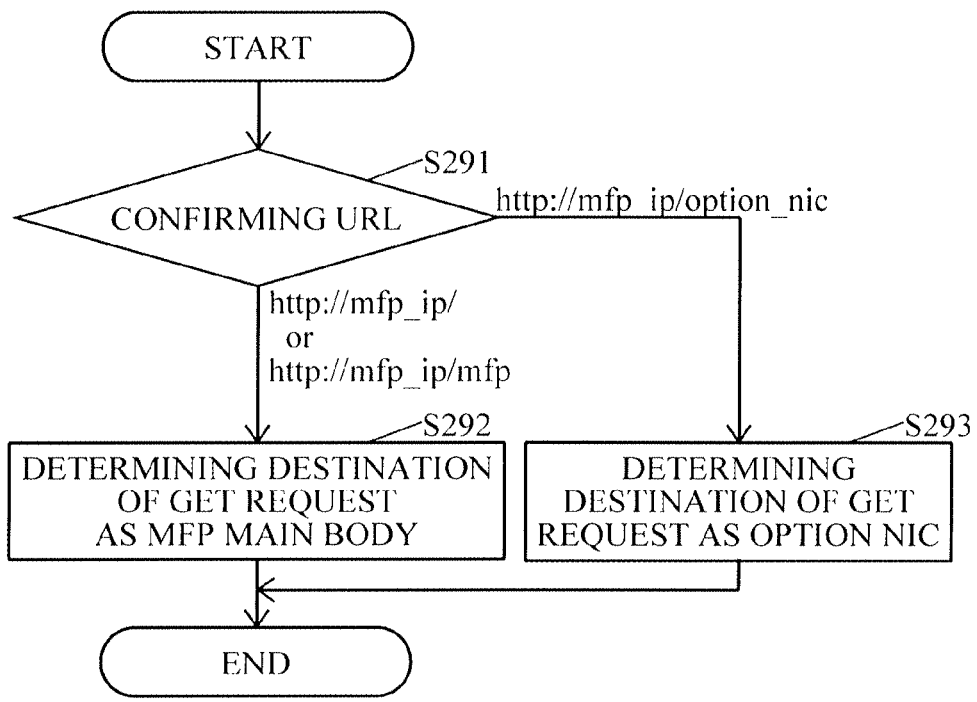
FIG. 7 illustrates an example flow for switching a request transfer destination performed when the MFP main body-side normal connection is established, according to an embodiment of the present disclosure.

FIG. 7 illustrates an example flow of switching processing of a request transfer destination performed when the MFP main body-side normal connection is established. The example flow of FIG. 7 relates to the switching processing of the request transfer destination performed by an httpd of the MFP main body.

As illustrated in FIG. 7, httpd 53 of MFP main body 30 confirms the URL of the GET request (S291), and because the confirmed URL is "http://mfp_ip/", the transfer destination of the GET request is determined as the HTTP server of MFP main body 30 (S292).

As illustrated in FIG. 5, httpd 53 of MFP main body 30 determines the transfer destination of the GET request as HTTP server 52, and then transfers the GET request to HTTP server 52 (S202).

Next, HTTP server 52 acquires the MFP main body setting Web page corresponding to the GET request from the application of the MFP main body, and passes the acquired MFP main body setting Web page to httpd 53 (S203) thereby establishing the MFP main body-side normal connection.

Subsequently, httpd 53 sends the MFP main body setting Web page passed from HTTP server 52 to Web browser 111 (S204).

As illustrated in FIG. 6, the MFP main body setting Web page is finally received by the Web browser of the PC via httpd 53, TCP control unit 54, IP control unit 55, Ethernet control unit 56, and network communication unit 36, sequentially.

Figure 8:
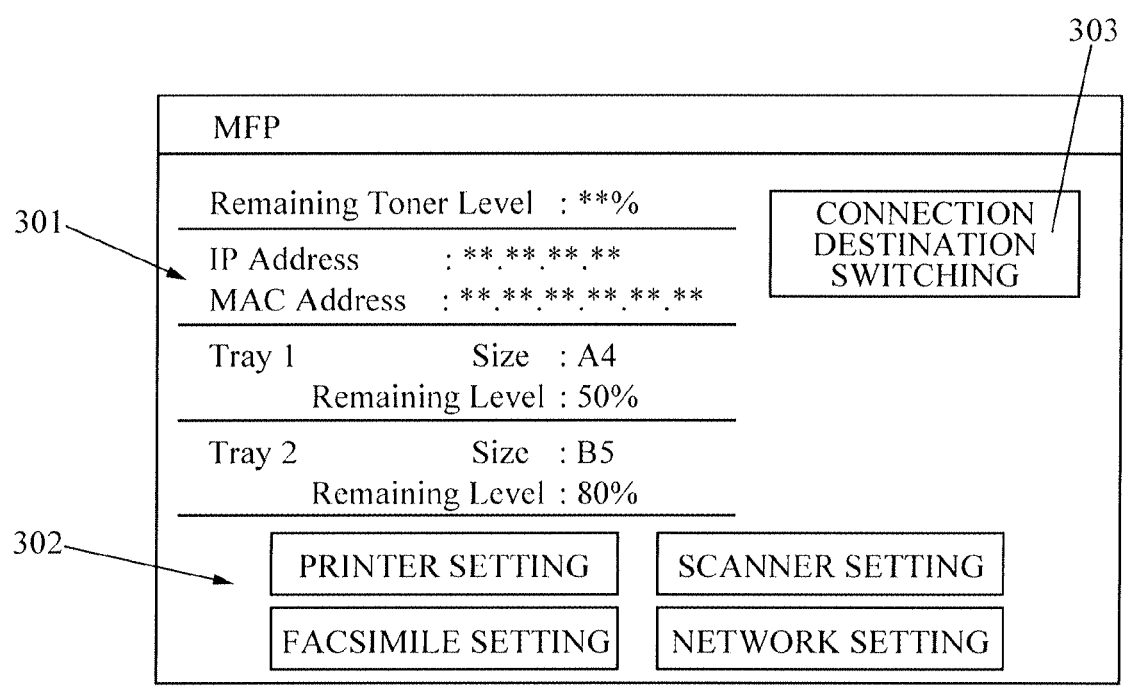
FIG. 8 illustrates an example of an MFP main body setting Web page, according to an embodiment of the present disclosure.

FIG. 8 illustrates an example of the MFP main body setting Web page. The MFP main body setting Web page exemplified in FIG. 8 is displayed on a display unit of the PC by the Web browser.

The MFP main body setting Web page illustrated in FIG. 8 includes display area 301 for displaying different kinds of information on the MFP main body, plurality of setting buttons 302 used to display Web pages for different kinds of settings of the MFP main body, and connection destination switching button 303 for switching a connection destination of the Web browser. Accordingly, while the MFP main body-side normal connection is established, the user can confirm different kinds of information on the MFP main body and execute different kinds of settings of the MFP main body through the MFP main body setting Web page. For example, through setting buttons 302, the user can change network settings of the MFP main body such as changing the media access control (MAC) address filtering settings, IP filtering settings, or security architecture for Internet protocol (IPsec) settings.

Figure 9:
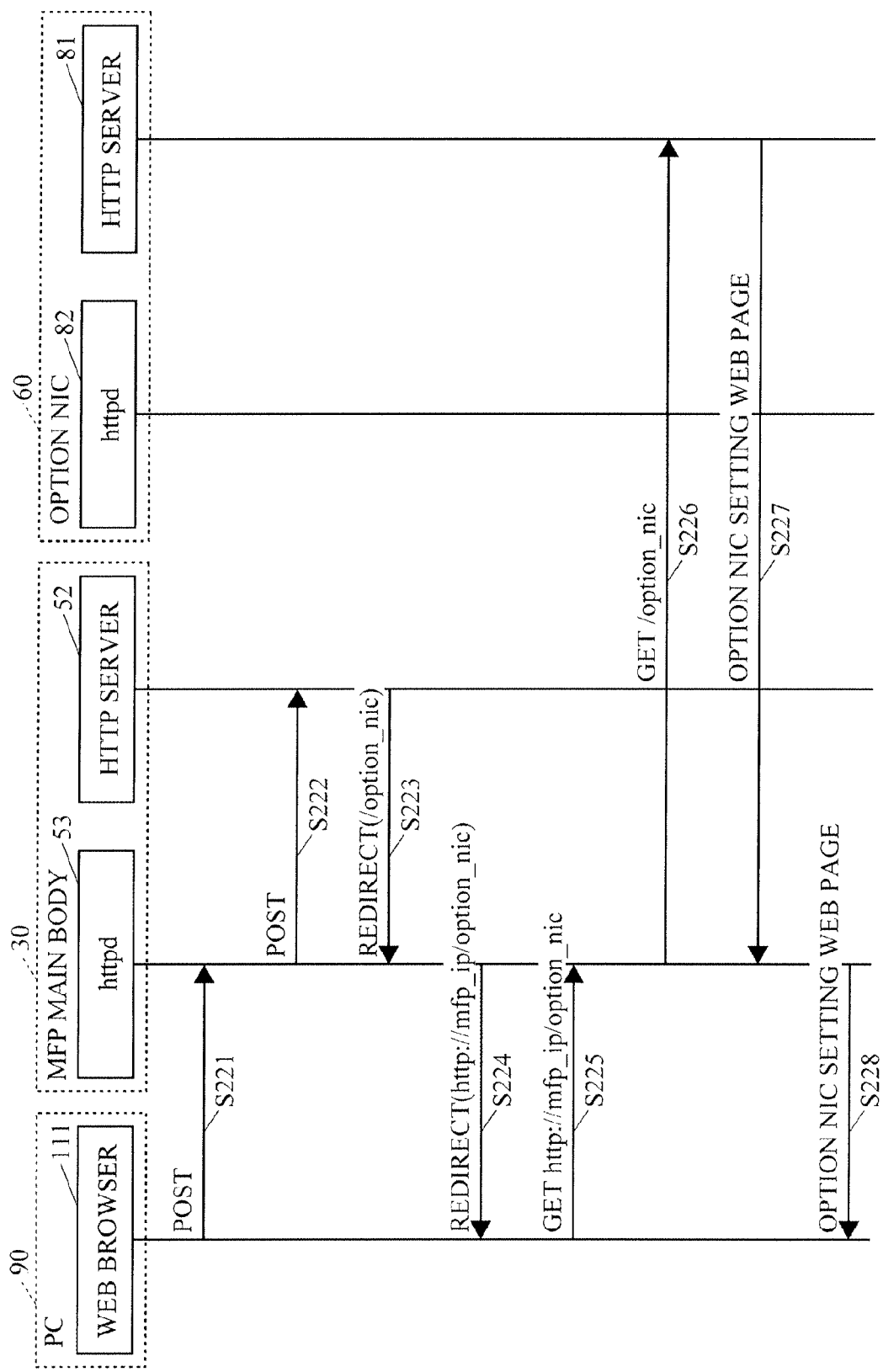
FIG. 9 illustrates an example operation of the network system of FIG. 1 performed to switch from the MFP main body-side normal connection to an MFP main body-side transfer connection, according to an embodiment of the present disclosure.

FIG. 9 illustrates an example operation of network system 10 performed to switch from the MFP main body-side normal connection to MFP main body-side transfer connection. The example of FIG. 9 relates to the operation of network system 10 performed when the user depresses a connection destination switching button, such as connection destination switching button 303, of the MFP main body setting Web page through the operation unit of PC 90 while the MFP main body-side normal connection is established.

If the user depresses the connection destination switching button of the MFP main body setting Web page through the operation unit of PC 90, as illustrated in FIG. 9, Web browser 111 transmits a POST request indicating that the connection destination switching button has been depressed to "http://mfp_ip/" (S221).

When Web browser 111 transmits the POST request to "http://mfp_ip/" in Step S221, the POST request is received by network communication unit 36 of MFP main body 30 corresponding to the IP address "mfp_ip".

As illustrated in FIG. 6, the POST request is transferred to httpd 53 via Ethernet control unit 56, IP control unit 55, and TCP control unit 54, sequentially. Httpd 53 determines a transfer destination of the POST request based on a URL of the POST request transferred from TCP control unit 54.

As illustrated in FIG. 7, httpd 53 of MFP main body 30 confirms the URL of the POST request (S291), and because the confirmed URL is "http://mfp_ip/", the transfer destination of the POST request is determined as the HTTP server of MFP main body 30(S292).

As illustrated in FIG. 9, httpd 53 determines the transfer destination of the POST request as HTTP server 52, and then transfers the POST request to HTTP server 52 (S222).

Next, HTTP server 52 passes a redirection destination URL "/option_nic" to httpd 53 in response to the POST request indicating that the connection destination switching button has been depressed (S223).

Subsequently, httpd 53 sends the redirection destination URL "http://mfp_ip/option_nic" passed from HTTP server 52 to Web browser 111 (S224).

Accordingly, even if PC 90 does not retain the Option NIC-side switching URL in advance, the MFP is allowed to easily switch from the MFP main body-side normal connection to the MFP main body-side transfer connection based on the Option NIC-side switching URL of which the PC 90 has been notified by MFP main body 30.

As illustrated in FIG. 6, the redirection destination URL "http://mfp_ip/option_nic" is received by Web browser 111 via httpd 53, TCP control unit 54, IP control unit 55, Ethernet control unit 56, and the network communication unit 36, sequentially. In other words, while the MFP main body-side normal connection is established, httpd 53 notifies the PC of the Option NIC-side switching URL "http://mfp_ip/option_nic" in response to the POST request which indicates that the connection destination switching button has been depressed and which has been received from the PC.

Subsequently, as illustrated in FIG. 9, the Web browser 111 transmits the GET request to the received redirection destination URL "http://mfp_ip/option_nic" (S225). In other words, PC 90 requests httpd 53 for a connection to "http://mfp_ip/option_nic" serving as the Option NIC-side switching URL.

When Web browser 111 transmits the GET request to "http://mfp_ip/option_nic" in Step S225, the GET request is received by the network communication unit of MFP main body 30 corresponding to the IP address "mfp_ip".

Figure 10:
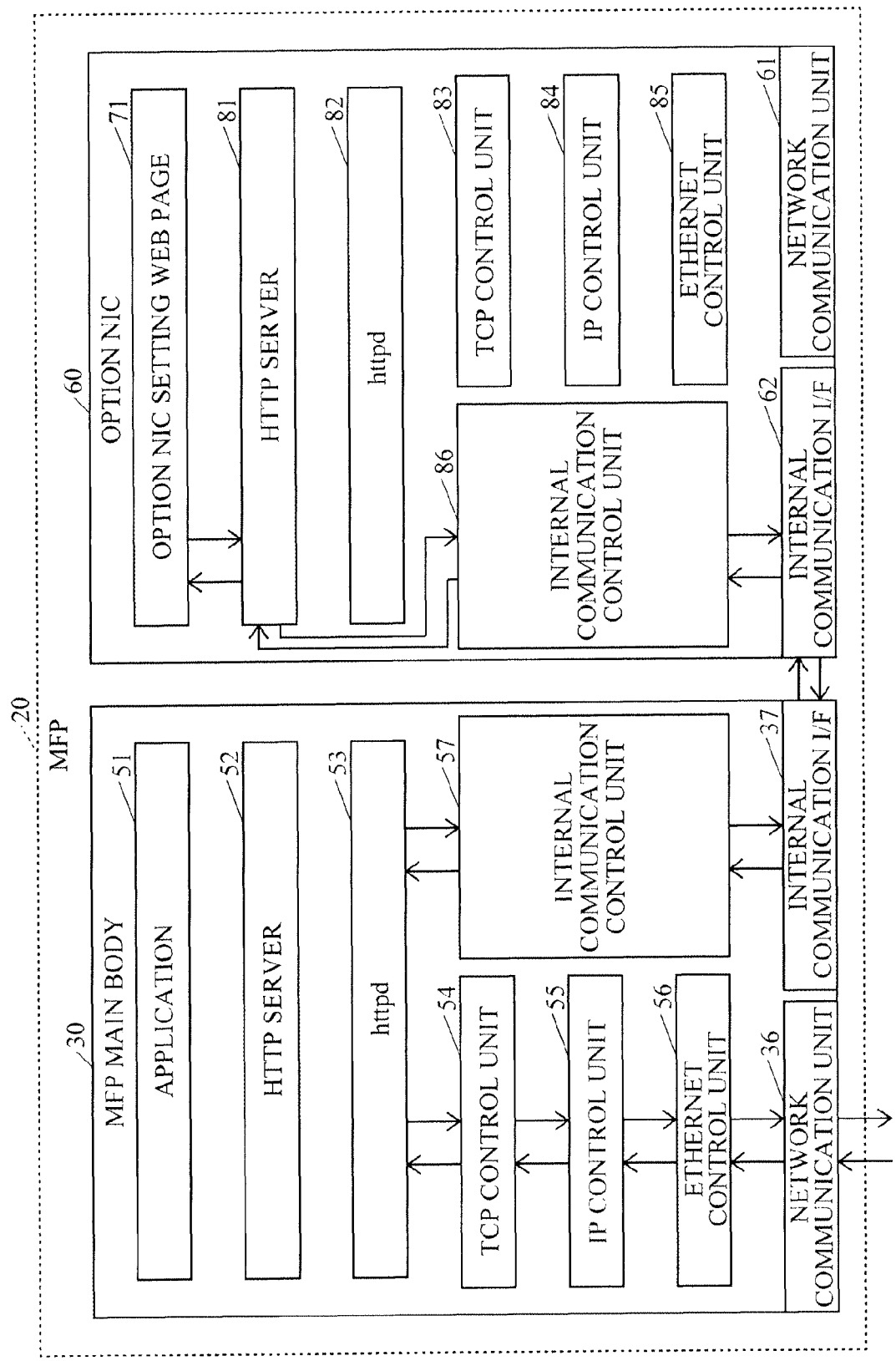
FIG. 10 illustrates a flow of information within the MFP obtained while the MFP main body-side transfer connection is established, according to an embodiment of the present disclosure.

FIG. 10 illustrates a flow of information within the MFP obtained while the MFP main body-side transfer connection is established.

As illustrated in FIG. 10, the GET request is transferred to httpd 53 via Ethernet control unit 56, IP control unit 55, and TCP control unit 54, sequentially. Httpd 53 determines a transfer destination of the GET request, as illustrated in FIG. 7, based on a URL of the GET request transferred from TCP control unit 54.

As illustrated in FIG. 7, the httpd of the MFP main body confirms the URL of the GET request (S291), and because the confirmed URL is "http://mfp_ip/option_nic", the transfer destination of the GET request is determined as the Option NIC (S293).

As illustrated in FIG. 9, when httpd 53 determines the transfer destination of the GET request to be Option NIC 60, httpd 53 disconnects the MFP main body-side normal connection and then transfers the GET request to Option NIC 60 (S226).

As illustrated in FIG. 10, the GET request is transferred to HTTP server 81 of Option NIC 60 via internal communication control unit 57, internal communication I/F 37, internal communication I/F 62, and internal communication control unit 86, sequentially.

As illustrated in FIG. 9, HTTP server 81 acquires an Option NIC setting Web page corresponding to the GET request from Option NIC setting Web page 71, and sends the acquired Option NIC setting Web page to httpd 53 as illustrated in FIG. 9 (S227).

As illustrated in FIG. 10, the Option NIC setting Web page is received by httpd 53 via server 81, internal communication control unit 86, internal communication I/F 62, internal communication I/F 37, and internal communication control unit 57, sequentially. In other words, httpd 53 establishes the MFP main body-side transfer connection.

Subsequently, as illustrated in FIG. 9, httpd 53 sends the Option NIC setting Web page passed from HTTP server 81 to Web browser 111 (S228).

As illustrated in FIG. 10, the Option NIC setting Web page is finally received by Web browser 111 via httpd 53, TCP control unit 54, IP control unit 55, Ethernet control unit 56, and network communication unit 36, sequentially.

Accordingly, instead of causing the HTTP server of the MFP main body to provide the Option NIC setting Web page, the MFP can cause the HTTP server of Option NIC 60 to provide the Option NIC setting Web page to the PC by establishing the connection between the PC and the HTTP server of the Option NIC via the MFP main body.

Accordingly, even if there is a change in a combination of the MFP main body and the Option NIC due to a model change or a change in product specifications, it is possible to provide the Option NIC setting Web page via the MFP main body.

Figure 11:
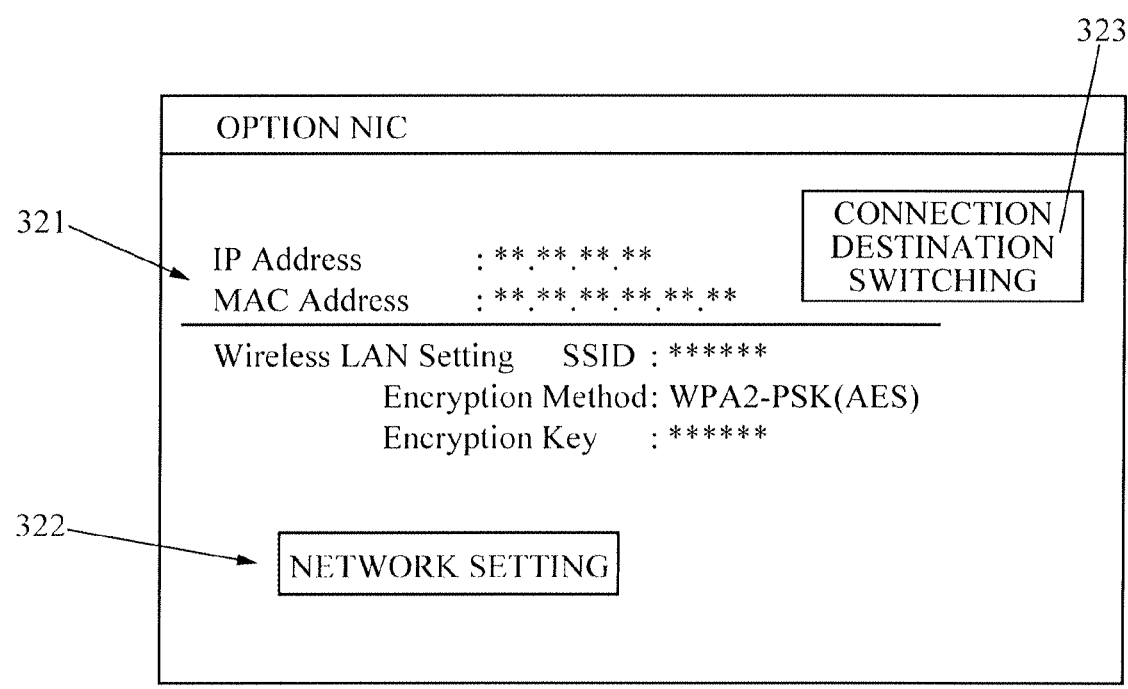
FIG. 11 illustrates an example of a Web page for Option NIC setting, according to an embodiment of the present disclosure.

FIG. 11 illustrates an example of the Option NIC setting Web page. The Option NIC setting Web page exemplified in FIG. 11 is displayed on display unit 92 of the PC 90 by Web browser 111.

The Option NIC setting Web page illustrated in FIG. 11 includes display area 321 for displaying different kinds of information on the Option NIC, setting button 322 used to display a Web page for different kinds of settings of the Option NIC, and connection destination switching button 323 for switching a connection destination of the Web browser.

Accordingly, while the MFP main body-side transfer connection is established, the user can confirm different kinds of information on the Option NIC and execute different kinds of settings of the Option NIC through the Option NIC setting Web page. For example, through setting button 322, the user can change network settings of the Option NIC such as changing MAC address filtering settings, IP filtering settings, and IPsec settings.

Figure 12:
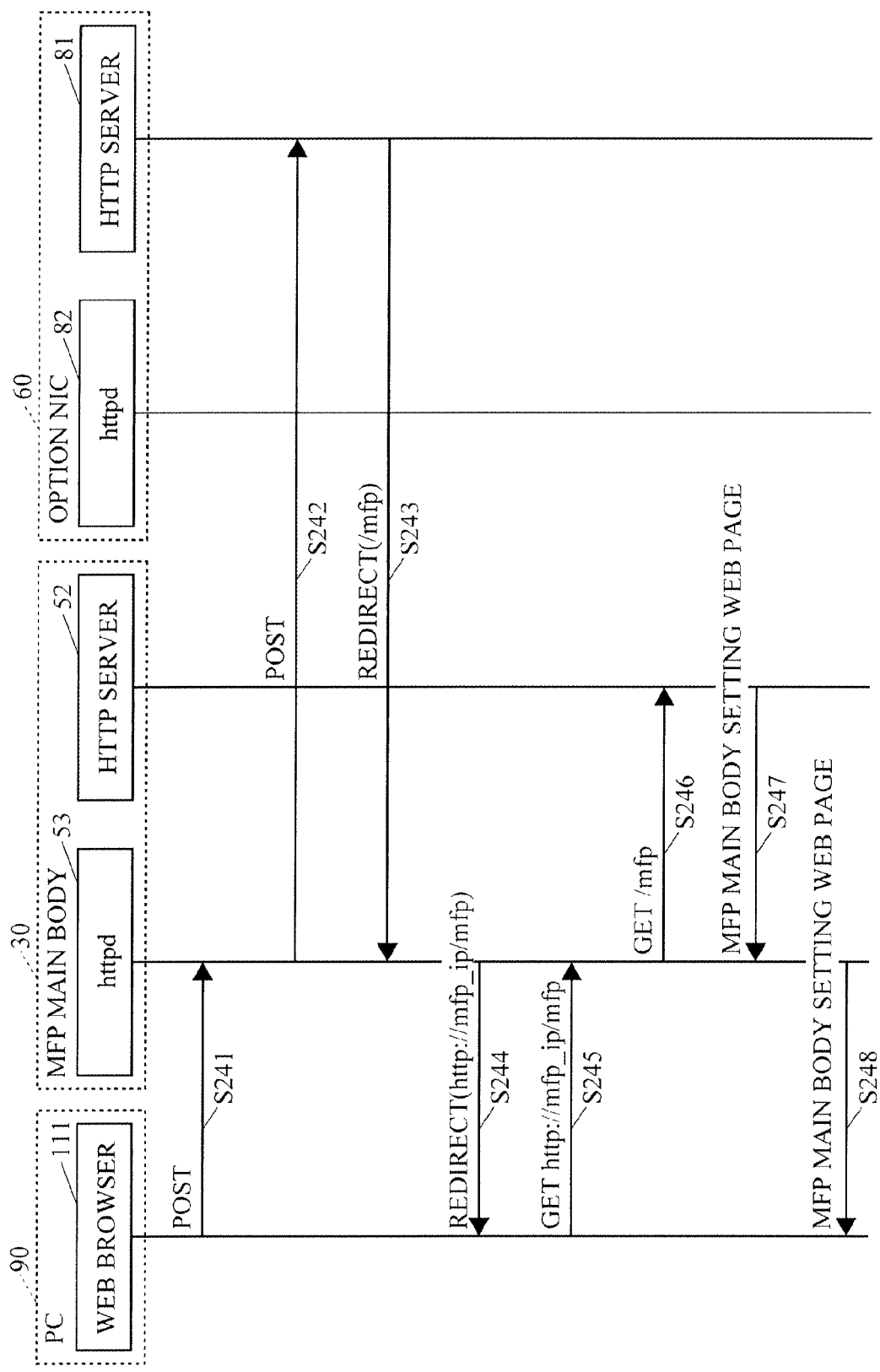
FIG. 12 illustrates an example operation of the network system of FIG. 1 performed to switch from the MFP main body-side transfer connection to the MFP main body-side normal connection, according to an embodiment of the present disclosure.

FIG. 12 illustrates an example operation of network system 10 switching from the MFP main body-side transfer connection to the MFP main body-side normal connection. The example of FIG. 12 relates to the operation of network system 10 performed when a user depresses a connection destination switching button, such as connection destination switching button 323, of the Option NIC setting Web page through the operation unit of PC 90 while the MFP main body-side transfer connection is established.

As illustrated in FIG. 12, if the user depresses the connection destination switching button of the Option NIC setting Web page through the operation unit of PC 90, Web browser 111 transmits a POST request indicating that the connection destination switching button has been depressed to "http://mfp_ip/option_nic" (S241).

When Web browser 111 transmits the POST request to "http://mfp_ip/option_nic" in Step S241, the POST request is received by the network communication unit of MFP main body 30 corresponding to the IP address "mfp_ip".

As illustrated in FIG. 10, the POST request is transferred to httpd 53 via Ethernet control unit 56, IP control unit 55, and TCP control unit 54, sequentially.

Httpd 53 determines a transfer destination of the POST request based on a URL of the POST request transferred from TCP control unit 54.

As illustrated in FIG. 7, httpd 53 of MFP main body 30 confirms the URL of the POST request (S291), and because the confirmed URL is "http://mfp_ip/option_nic", the transfer destination of the POST request is determined as the Option NIC (S293).

As illustrated in FIG. 12, httpd 53 determines the transfer destination of the POST request as Option NIC 60, and then transfers the POST request to Option NIC 60 (S242).

As illustrated in FIG. 10, the POST request is transferred to the HTTP server 81 of Option NIC 60 via internal communication control unit 57, internal communication I/F 37, internal communication I/F 62, and internal communication control unit 86, sequentially.

Then, as illustrated in FIG. 12, the HTTP server 81 passes a redirection destination URL "/mfp" to httpd 53 in response to the POST request indicating that the connection destination switching button has been depressed (S243).

As illustrated in FIG. 10, the redirection destination URL "/mfp" is received by httpd 53 via HTTP server 81, internal communication control unit 86, internal communication I/F 62, internal communication I/F 37, and internal communication control unit 57, sequentially.

Subsequently, as illustrated in FIG. 12, httpd 53 sends the redirection destination URL "http://mfp_ip/mfp" passed from the HTTP server 81 to Web browser 111 (S244).

As illustrated in FIG. 10, redirection destination URL "http://mfp_ip/mfp" is finally received by the Web browser via httpd 53, TCP control unit 54, IP control unit 55, Ethernet control unit 56, and network communication unit 36, sequentially. In other words, while the MFP main body-side transfer connection is established, httpd 53 notifies the PC of the MFP main body-side switching URL "http://mfp_ip/mfp" in response to the POST request which indicates that the connection destination switching button has been depressed and which has been received from the PC.

Subsequently, as illustrated in FIG. 12, Web browser 111 transmits the GET request to the received redirection destination URL "http://mfp_ip/mfp" (S245). In other words, PC 90 requests httpd 53 for a connection to "http://mfp_ip/mfp" serving as the MFP main body-side switching URL.

When Web browser 111 transmits the GET request to "http://mfp_ip/mfp" in Step S245, the GET request is received by network communication unit 36 of the MFP main body 30 corresponding to the IP address "mfp_ip".

Accordingly, the MFP is allowed to easily switch from the MFP main body-side transfer connection to the MFP main body-side normal connection.

As illustrated in FIG. 6, the GET request is transferred to httpd 53 via Ethernet control unit 56, IP control unit 55, and TCP control unit 54, sequentially. Httpd 53 determines a transfer destination of the GET request based on a URL of the GET request transferred from TCP control unit 54.

As illustrated in FIG. 7, httpd 53 of MFP main body 30 confirms the URL of the GET request (S291), and because the confirmed URL is "http://mfp_ip/mfp", the transfer destination of the GET request is determined as HTTP server 52 (S292).

As illustrated in FIG. 12, when httpd 53 determines the transfer destination of the GET request as HTTP server 52, httpd 53 disconnects the MFP main body-side transfer connection and then transfers the GET request to HTTP server 52 (S246).

Next, HTTP server 52 acquires the MFP main body setting Web page corresponding to the GET request from application 51, and passes the acquired MFP main body setting Web page to httpd 53 (S247). In other words, httpd 53 establishes the MFP main body-side normal connection.

Subsequently, httpd 53 sends the MFP main body setting Web page passed from HTTP server 52 to Web browser 111 (S248).

As illustrated in FIG. 6, the MFP main body setting Web page is received by Web browser 111 via httpd 53, TCP control unit 54, IP control unit 55, Ethernet control unit 56, and network communication unit 36, sequentially.

Accordingly, while the MFP main body-side normal connection is established, the user can confirm different kinds of information on MFP main body 30 and execute different kinds of setting of MFP main body 30 through the MFP main body setting Web page.

In the above-mentioned manner, the user can freely switch between (i) the communications between the Web browser of the PC and the HTTP server of the MFP main body, via the network communication unit of the MFP main body and (ii) the communications between the Web browser of the PC and the HTTP server of the Option NIC, via the network communication unit of the MFP main body. Further, the user can completely disconnect those communications by terminating the Web browser.

Next, a description is made of communications between the MFP and the PC via the network communication unit of the Option NIC.

Figure 13:
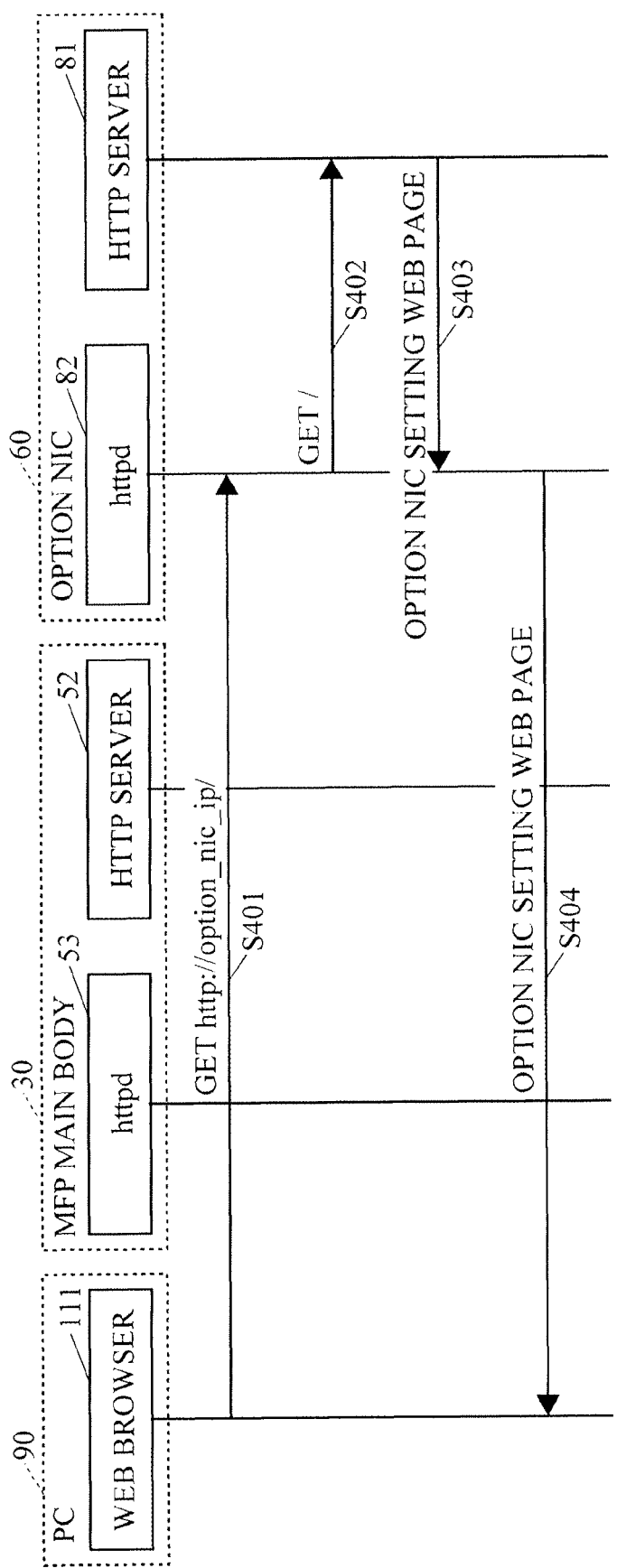
FIG. 13 illustrates an example of operation of the network system of FIG. 1 performed to establish an Option NIC-side normal connection, according to an embodiment of the present disclosure.

FIG. 13 illustrates an example operation of the network system performed to establish the Option NIC-side normal connection. The example of FIG. 13 relates to operation of network system 10 when a user inputs the IP address of Option NIC 60 to Web browser 111 through the operation unit of PC 90.

As illustrated in FIG. 13, if the user activates Web browser 111 through the operation unit of PC 90 and inputs the IP address of Option NIC 60 "option_nic_ip" to Web browser 111, Web browser 111 transmits the GET request to "http://option_nic_ip/" (S401).

When Web browser 111 transmits the GET request to "http://option_nic_ip/" in Step S401, the GET request is received by the network communication unit of Option NIC 60 corresponding to the IP address "option_nic_ip".

Figure 14:
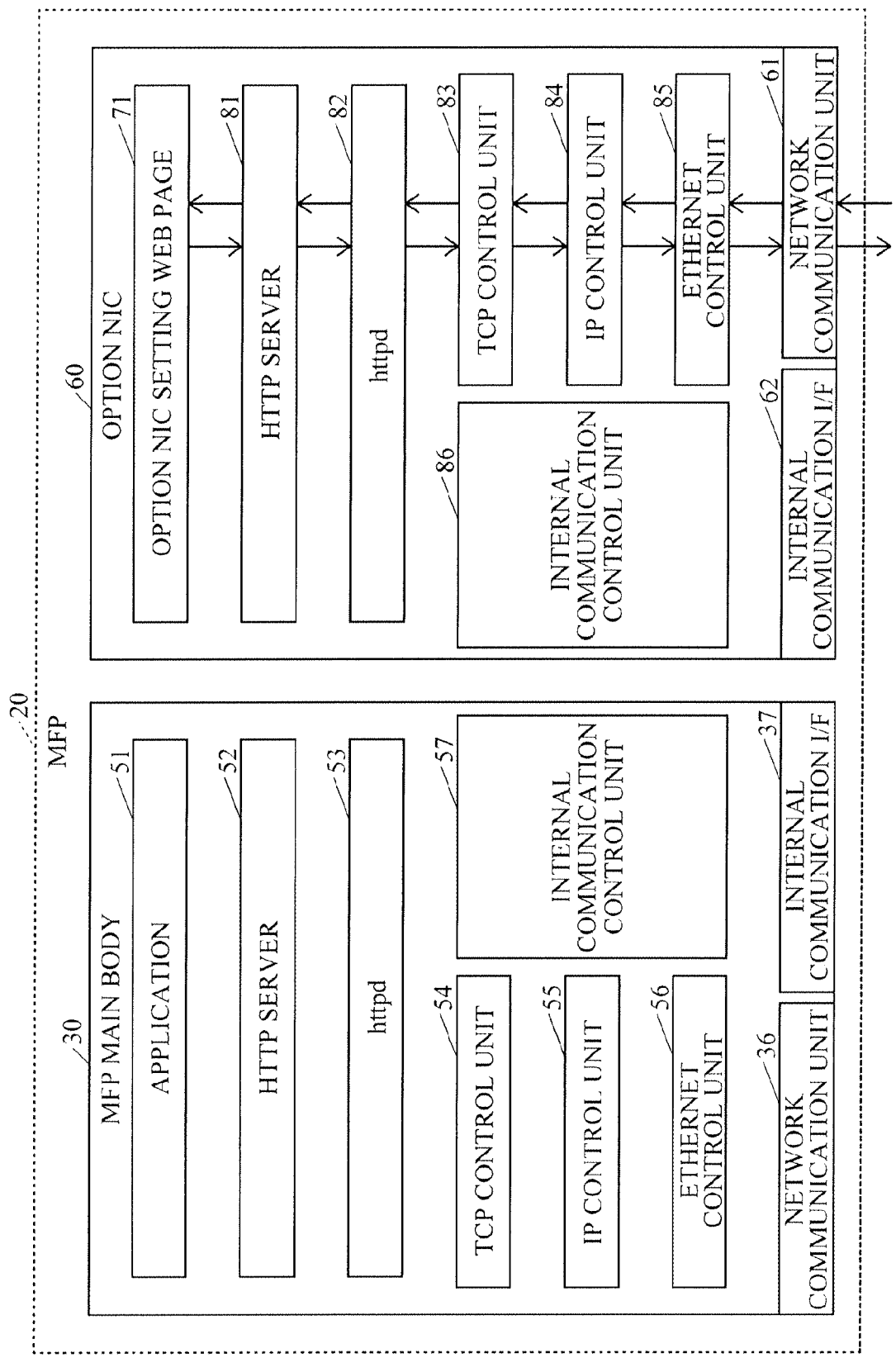
FIG. 14 illustrates a flow of information within the MFP obtained while the Option NIC-side normal connection is established, according to an embodiment of the present disclosure.

FIG. 14 illustrates a flow of information within the MFP obtained while the Option NIC-side normal connection is established.

As illustrated in FIG. 14, the GET request is transferred to httpd 82 via Ethernet control unit 85, IP control unit 84, and TCP control unit 83, sequentially. Httpd 82 determines a transfer destination of the GET request based on a URL of the GET request transferred from TCP control unit 83.

Figure 15:
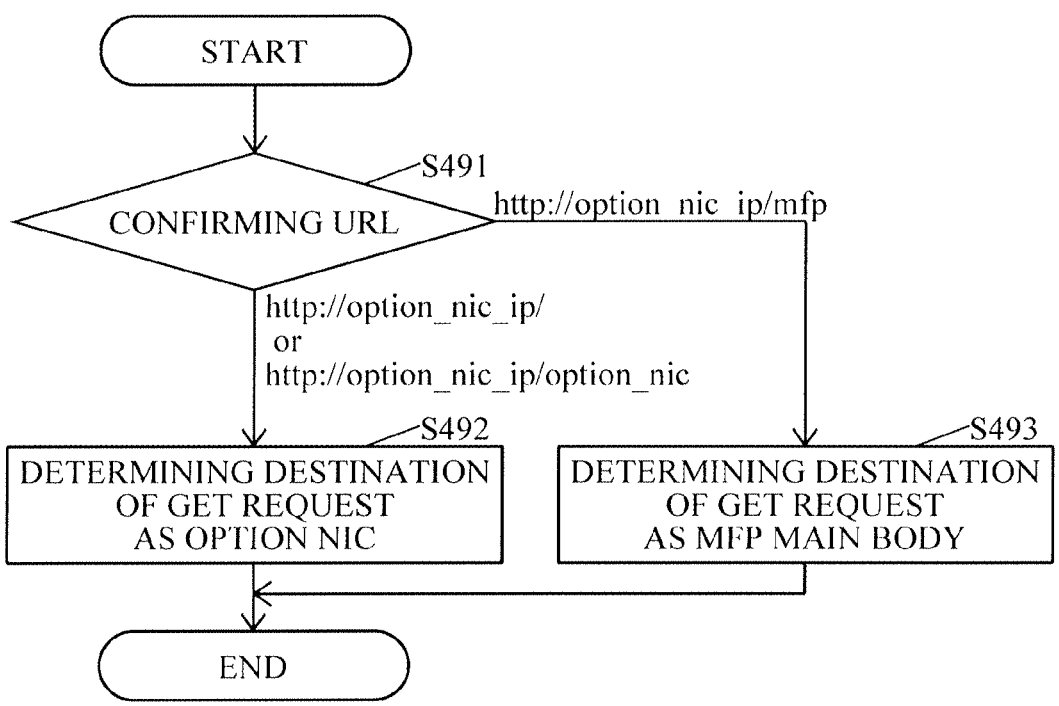
FIG. 15 illustrates an example flow for switching the request transfer destination performed when the Option NIC-side normal connection is established, according to an embodiment of the present disclosure.

FIG. 15 illustrates an example flow for switching processing of a request transfer destination performed when the Option NIC-side normal connection is established. The example flow of FIG. 15 relates to the switching processing of the request transfer destination performed by httpd 82 of Option NIC 60.

As illustrated in FIG. 15, httpd 82 of Option NIC 60 confirms the URL of the GET request (S491), and because the confirmed URL is "http://option_nic_ip/", the transfer destination of the GET request is determined as the HTTP server of Option NIC 60 (S492).

As illustrated in FIG. 13, httpd 82 determines the transfer destination of the GET request as HTTP server 81, and then transfers the GET request to HTTP server 81 (S402).

Next, HTTP server 81 acquires the Option NIC setting Web page corresponding to the GET request from the Option NIC setting Web page, and passes the acquired Option NIC setting Web page to httpd 82 (S403), thereby establishing the Option NIC-side normal connection.

Subsequently, httpd 82 sends the Option NIC setting Web page passed from HTTP server 81 to Web browser 111 (S404).

As illustrated in FIG. 14, the Option NIC setting Web page is received by Web browser 111 via httpd 82, TCP control unit 83, IP control unit 84, Ethernet control unit 85, and network communication unit 61, sequentially.

Accordingly, while the Option NIC-side normal connection is established, the user can confirm different kinds of information on Option NIC 60 and execute different kinds of settings of Option NIC 60 through the Option NIC setting Web page.

Figure 16:
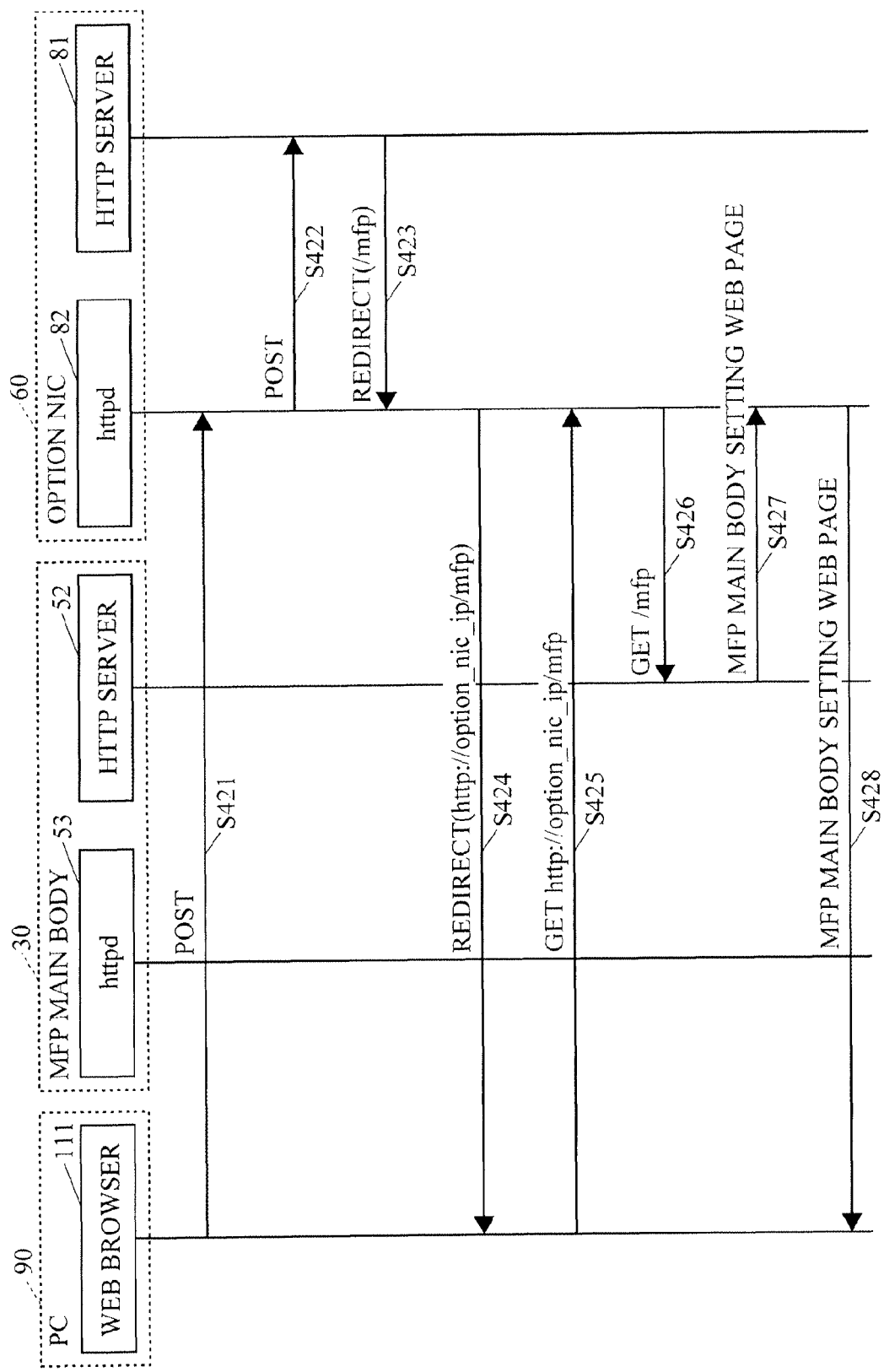
FIG. 16 illustrates an example operation of the network system of FIG. 1 performed to switch from the Option NIC-side normal connection to an Option NIC-side transfer connection, according to an embodiment of the present disclosure.

FIG. 16 illustrates an example operation of network system 10 performed to switch from the Option NIC-side normal connection to the Option NIC-side transfer connection. The sequence example of FIG. 16 relates to the operation of network system 10 performed when the user depresses a connection destination switching button of the Option NIC setting Web page through the operation unit of PC 90 while the Option NIC-side normal connection is established.

As illustrated in FIG. 16, if the user depresses the connection destination switching button of the Option NIC setting Web page through the operation unit of PC 90, Web browser 111 transmits a POST request indicating that the connection destination switching button has been depressed to "http://option_nic_ip/" (S421).

When Web browser 111 transmits the POST request to "http://option_nic_ip/" in Step S421, the POST request is received by network communication unit 61 of Option NIC 60 corresponding to the IP address "option_nic_ip".

As illustrated in FIG. 14, the POST request is transferred to httpd 82 via Ethernet control unit 85, IP control unit 84, and TCP control unit 83, sequentially. Httpd 82 determines a transfer destination of the POST request based on a URL of the POST request transferred from TCP control unit 83.

As illustrated in FIG. 15, the httpd of the Option NIC confirms the URL of the POST request (S491), and because the confirmed URL is "http://option_nic_ip/", the transfer destination of the POST request is determined as the HTTP server of the Option NIC (S492).

As illustrated in FIG. 16, httpd 82 determines the transfer destination of the POST request as HTTP server 81, and then transfers the POST request to HTTP server 81 (S422).

Then, HTTP server 81 passes a redirection destination URL "/mfp" to httpd 82 in response to the POST request indicating that the connection destination switching button has been depressed (S423).

Subsequently, httpd 82 sends the redirection destination URL "http://option_nic_ip/mfp" passed from the HTTP server 81 to Web browser 111 (S424).

Accordingly, even if PC 90 does not retain the MFP main body-side switching URL in advance, the MFP is allowed to easily switch from the Option NIC-side normal connection to the Option NIC-side transfer connection based on the MFP main body-side switching URL of which PC 90 has been notified by Option NIC 60.

As illustrated in FIG. 14, the redirection destination URL "http://option_nic_ip/mfp" is received by Web browser 111 via httpd 82, TCP control unit 83, IP control unit 84, Ethernet control unit 85, and network communication unit 61, sequentially. In other words, while the Option NIC-side normal connection is established, httpd 82 notifies PC 90 of the MFP main body-side switching URL "http://option_nic_ip/mfp" in response to the POST request which indicates that the connection destination switching button 323 has been depressed and which has been received from PC 90.

Subsequently, as illustrated in FIG. 16, Web browser 111 transmits the GET request to the received redirection destination URL "http://option_nic_ip/mfp" (S425). In other words, PC 90 requests httpd 82 for a connection to "http://option_nic_ip/mfp" serving as the MFP main body-side switching URL.

When Web browser 111 transmits the GET request to "http://option_nic_ip/mfp" in Step S425, the GET request is received by the network communication unit of Option NIC 60 corresponding to the IP address "option_nic_ip".

Figure 17:
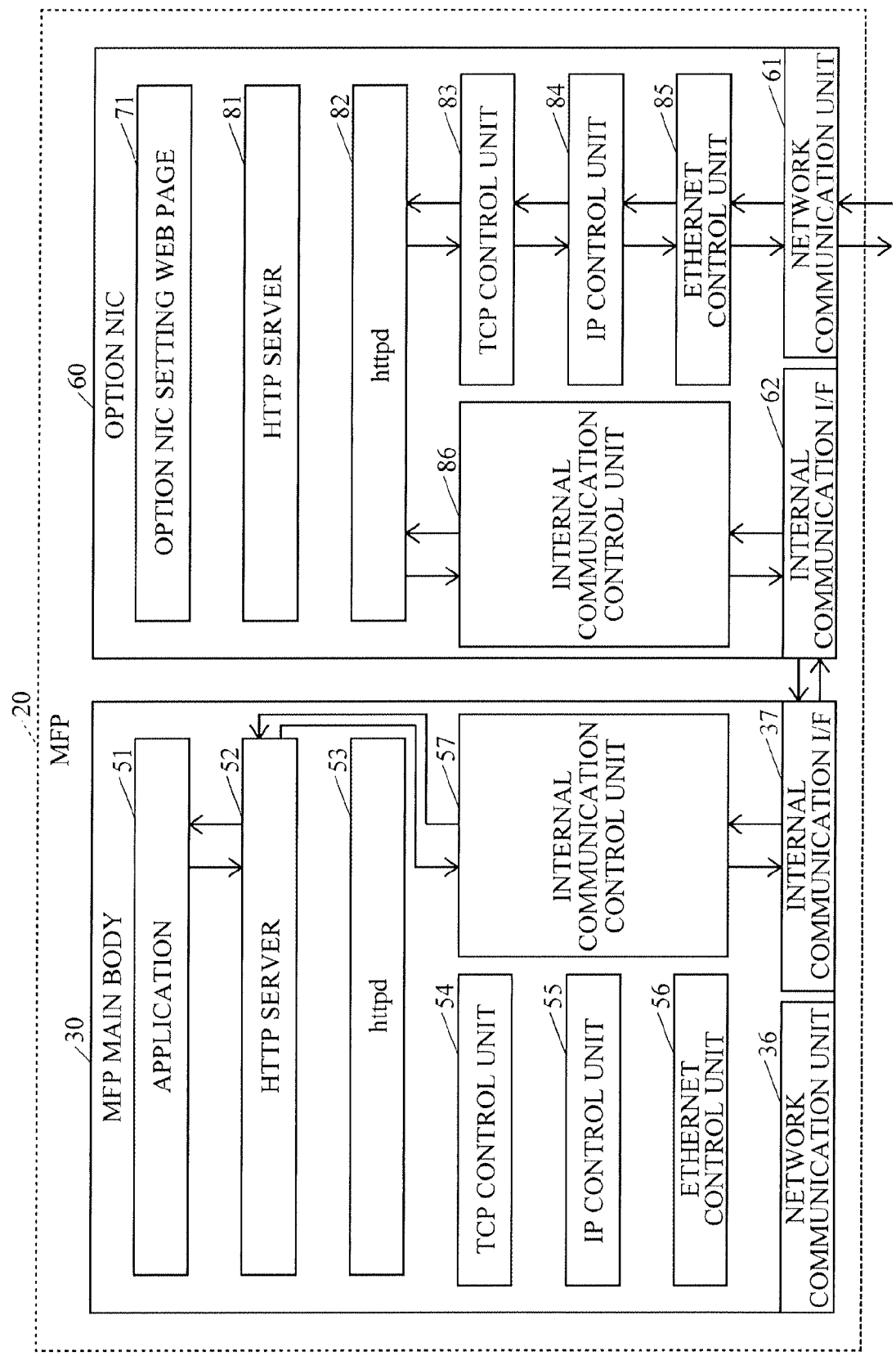
FIG. 17 illustrates a flow of information within the MFP obtained while the Option NIC-side transfer connection is established, according to an embodiment of the present disclosure.

FIG. 17 illustrates a flow of information within the MFP obtained while the Option NIC-side transfer connection is established.

As illustrated in FIG. 17, the GET request is transferred to httpd 82 via Ethernet control unit 85, IP control unit 84, and TCP control unit 83, sequentially. Httpd 82 determines a transfer destination of the GET request based on a URL of the GET request transferred from TCP control unit 83.

As illustrated in FIG. 15, the httpd of the Option NIC confirms the URL of the GET request (S491), and because the confirmed URL is "http://option_nic_ip/mfp", the transfer destination of the GET request is determined as the MFP main body (S493).

As illustrated in FIG. 16, when httpd 82 determines the transfer destination of the GET request as MFP main body 30, httpd 82 disconnects the Option NIC-side normal connection and then transfers the GET request to MFP main body 30 (S426).

As illustrated in FIG. 17, the GET request is transferred to HTTP server 52 of MFP main body 30 via internal communication control unit 86, internal communication I/F 62, internal communication I/F 37, and internal communication control unit 57, sequentially.

As illustrated in FIG. 16, HTTP server 52 acquires the MFP main body setting Web page corresponding to the GET request from application 51, and sends the acquired MFP main body setting Web page to the httpd 82 (S427).

As illustrated in FIG. 17, the MFP main body setting Web page is received by httpd 82 via HTTP server 52, internal communication control unit 57, internal communication I/F 37, internal communication I/F 62, and internal communication control unit 86, sequentially. In other words, httpd 82 establishes the Option NIC-side transfer connection.

Subsequently, as illustrated in FIG. 16, httpd 82 sends the MFP main body setting Web page passed from HTTP server 52 to Web browser 111 (S428).

As illustrated in FIG. 17, the MFP main body setting Web page is finally received by Web browser 111 via httpd 82, TCP control unit 83, IP control unit 84, Ethernet control unit 85, and network communication unit 61, sequentially.

Accordingly, the MFP can cause HTTP server 52 of MFP main body 30 to provide the MFP main body setting Web page to PC 90 by establishing the connection between PC 90 and HTTP server 52 of the MFP main body 30 via the Option NIC 60.

Accordingly, even if there is a change in a combination of MFP main body 30 and Option NIC 60 due to a model change or a change in product specifications, it is possible to provide the MFP main body setting Web page via the Option NIC.

Further, while the Option NIC-side transfer connection is established, the user can confirm different kinds of information on the MFP main body 30 and execute different kinds of settings of the MFP main body 30 through the MFP main body setting Web page.

Figure 18:
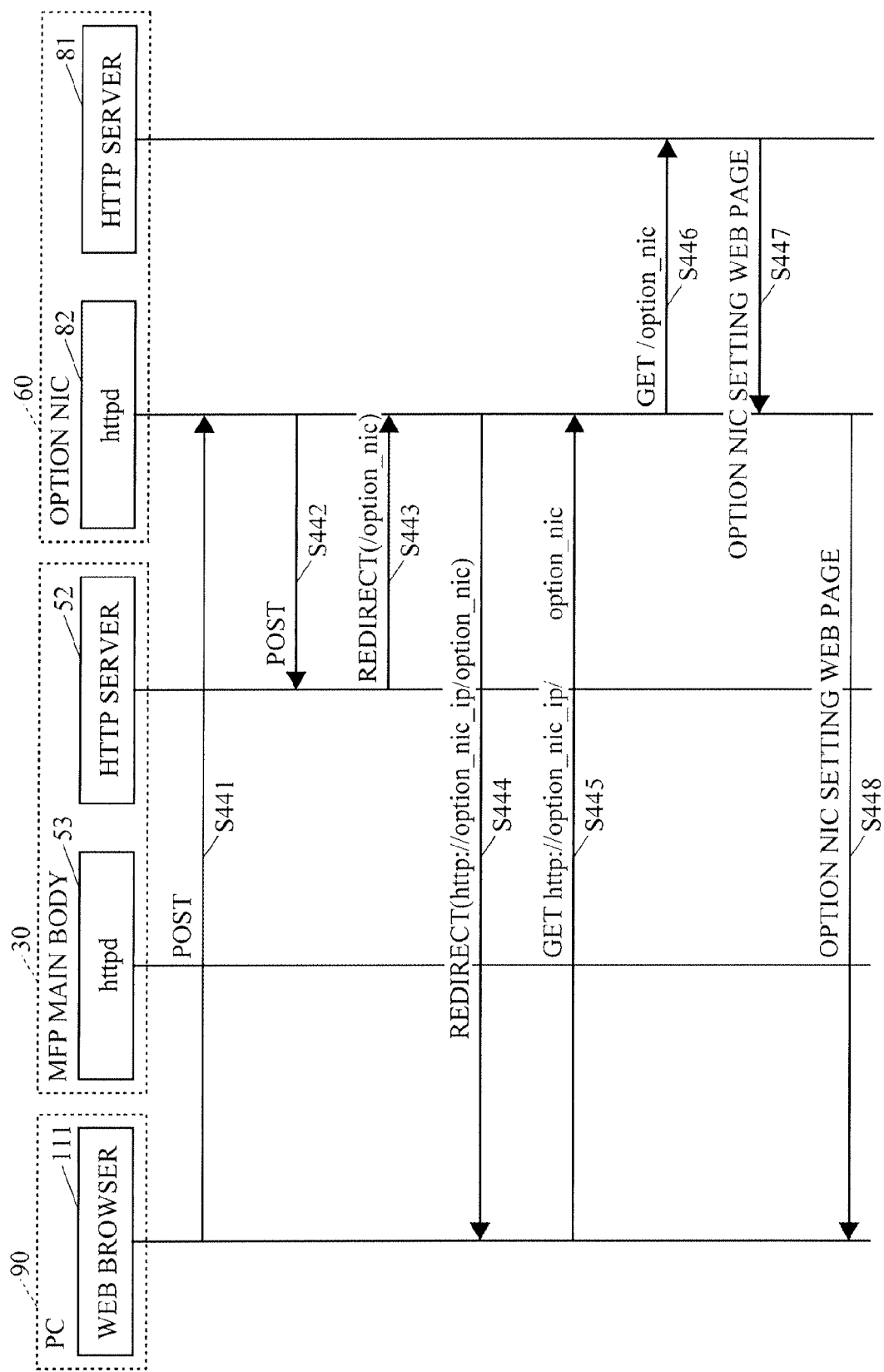
FIG. 18 illustrates an example operation of the network system of FIG. 1 performed to switch from the Option NIC-side transfer connection to the Option NIC-side normal connection, according to an embodiment of the present disclosure.

FIG. 18 illustrates an example operation of the network system 10 performed to switch from the Option NIC-side transfer connection to the Option NIC-side normal connection. The sequence example of FIG. 18 relates to operation of the network system 10 performed when a user depresses the connection destination switching button, such as connection destination switching button 323, of the MFP main body setting Web page through the operation unit of PC 90 while the Option NIC-side transfer connection is established.

As illustrated in FIG. 18, if the user depresses the connection destination switching button of the MFP main body setting Web page through the operation unit of PC 90, Web browser 111 transmits a POST request indicating that the connection destination switching button has been depressed to "http://option_nic_ip/mfp" (S441).

When Web browser 111 transmits the POST request to "http://option_nic_ip/mfp" in Step S441, the POST request is received by network communication unit 61 of Option NIC 60 corresponding to the IP address "option_nic_ip".

As illustrated in FIG. 17, the POST request is transferred to httpd 82 via Ethernet control unit 85, IP control unit 84, and TCP control unit 83, sequentially. Httpd 82 determines a transfer destination of the POST request based on a URL of the POST request transferred from the TCP control unit 83.

As illustrated in FIG. 15, httpd 82 of Option NIC 60 confirms the URL of the POST request (S491), and because the confirmed URL is "http://option_nic_ip/mfp", the transfer destination of the POST request is determined as MFP main body 30 (S493).

As illustrated in FIG. 18, httpd 82 determines the transfer destination of the POST request as MFP main body 30, and then transfers the POST request to MFP main body 30 (S442).

As illustrated in FIG. 17, the POST request is transferred to HTTP server 52 of MFP main body 30 through the intermediation of internal communication control unit 86, internal communication I/F 62, internal communication I/F 37, and internal communication control unit 57 in the stated order.

Next, as illustrated in FIG. 18, HTTP server 52 sends a redirection destination URL "/option_nic" to httpd 82 in response to the POST request indicating that the connection destination switching button has been depressed (S443).

As illustrated in FIG. 17, the redirection destination URL "/option_nic" is received by httpd 82 via HTTP server 52, internal communication control unit 57, internal communication I/F 37, internal communication I/F 62, and internal communication control unit 86, sequentially.

Subsequently, as illustrated in FIG. 18, httpd 82 sends the redirection destination URL "http://option_nic_ip/option_nic" passed from HTTP server 52 to Web browser 111 (S444).

As illustrated in FIG. 17, the redirection destination URL "http://option_nic_ip/option_nic" is finally received by Web browser 111 via httpd 82, TCP control unit 83, IP control unit 84, Ethernet control unit 85, and network communication unit 61, respectively. In other words, while the Option NIC-side transfer connection is established, httpd 82 notifies PC 90 of the Option NIC-side switching URL "http://option_nic_ip/option_nic" in response to the POST request which indicates that the connection destination switching button has been depressed and which has been received from the PC.

Subsequently, as illustrated in FIG. 18, Web browser 111 transmits the GET request to the received redirection destination URL "http://option_nic_ip/option_nic" (S445). In other words, PC 90 requests httpd 82 for a connection to "http://option_nic_ip/option_nic" serving as the Option NIC-side switching URL.

When Web browser 111 transmits the GET request to "http://option_nic_ip/option_nic" in Step S445, the GET request is received by network communication unit 61 of Option NIC 60 corresponding to the IP address "option_nic_ip".

As illustrated in FIG. 14, the GET request is transferred to httpd 82 via Ethernet control unit 85, IP control unit 84, and TCP control unit 83, sequentially. Httpd 82 determines a transfer destination of the GET request based on a URL of the GET request transferred from TCP control unit 83.

As illustrated in FIG. 15, the httpd of the Option NIC confirms the URL of the GET request (S491), and because the confirmed URL is "http://option_nic_ip/option_nic/", the transfer destination of the GET request is determined as the HTTP server of the Option NIC (S492).

As illustrated in FIG. 18, when httpd 82 determines the transfer destination of the GET request as HTTP server 81, httpd 82 disconnects the Option NIC-side transfer connection and then transfers the GET request to HTTP server 81 (S446).

Next, HTTP server 81 acquires the Option NIC setting Web page corresponding to the GET request from Option NIC setting Web page 71, and passes the acquired Option NIC setting Web page to httpd 82 (S447). In other words, httpd 82 establishes the Option NIC-side normal connection.

Subsequently, httpd 82 sends the Option NIC setting Web page passed from HTTP server 81 to Web browser 111 (S448).

Accordingly, the MFP is allowed to easily switch from the Option NIC-side transfer connection to the Option NIC-side normal connection.

As illustrated in FIG. 14, the Option NIC setting Web page is received by Web browser 111 via httpd 82, TCP control unit 83, IP control unit 84, Ethernet control unit 85, and network communication unit 61, sequentially.

Accordingly, while the Option NIC-side normal connection is established, the user can confirm different kinds of information on Option NIC 60 and execute different kinds of setting of the Option NIC 60 through the Option NIC setting Web page.

In the above-mentioned manner, the user can freely switch between (i) the communications between the Web browser of the PC and the HTTP server of the Option NIC, via the network communication unit of the Option NIC and (ii) the communications between the Web browser of the PC and the HTTP server of the MFP main body, via the network communication unit of the Option NIC. Further, the user can completely disconnect those communications by terminating the Web browser.

In the embodiment of the present disclosure, if the MFP main body-side normal connection can no longer be performed, the Option NIC-side transfer connection can be used to correct the network setting of the MFP main body through the MFP main body setting Web page.

Accordingly, the MFP main body-side normal connection can be recovered even if there is an error in a network setting of the MFP main body such as, for example, an error in a filter setting such as MAC address filtering or IP filtering, through the MFP main body setting Web page.

In the embodiment of the present disclosure, if the Option NIC-side transfer connection can no longer be performed, the MFP main body-side normal connection can be used to correct the network setting of the Option NIC through the Option NIC setting Web page.

Accordingly, the Option NIC-side transfer connection can be recovered even if there is an error in a network setting of the Option NIC such as, for example, an error in a filter setting such as MAC address filtering or IP filtering through the Option NIC setting Web page.

In the embodiment of the present disclosure, if the Option NIC-side normal connection can no longer be performed, the MFP main body-side transfer connection can be used to correct the network setting of the Option NIC through the Option NIC setting Web page.

Accordingly, the Option NIC-side normal connection can be recovered even if there is an error in the network setting of the Option NIC such as, for example, an error in a wireless LAN setting, through the Option NIC setting Web page.

Further, the Option NIC-side normal connection can be recovered even if the network setting of the Option NIC cannot be corrected directly from the Option NIC because the Option NIC does not include the operation unit.

Note that, in the MFP 20, the network communication unit of the MFP main body 30 may be used for wireless communications, and the network communication unit of the Option NIC 60 may be used for wired communications. Further, the network communication unit of the MFP main body 30 and the network communication unit of the Option NIC 60 may be both used for wired communications, or may be both used for wireless communications.

In the network system according to the embodiment of the present disclosure, the MFP main body 30 and the Option NIC 60 may be a main electronic device and a sub-electronic device, respectively. Alternatively, in another example, in the network system 10, the MFP main body 30 and the Option NIC 60 can also constitute the sub-electronic device and the main electronic device, respectively.

In the embodiment of the present disclosure, the information processing device is the PC 90, but in other examples may be an information processing device other than the PC 90.

In the embodiment of the present disclosure, the image forming apparatus is the MFP main body 30, but in other examples may be an image forming apparatus other than the MFP main body 30 such as a standalone printer, a standalone FAX machine, or a standalone copier.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. A device information providing system, comprising:
    a main electronic device including:
        a main-side external communication unit configured to communicate with an information processing device;
        a main-side inter-device communication unit;
        a main-side HTTP server configured to provide a main-side page including a Web page of the main electronic device; and
        a main-side communication control unit configured to: (i) disconnect a main-side normal connection between the information processing device and the main-side HTTP server via the main-side external communication unit when a connection to a sub-side switching URL is requested by the information processing device while the main-side normal connection is established, and (ii) establish a main-side transfer connection between the information processing device and a sub-side HTTP server via the main-side external communication unit, the main-side inter-device communication unit, and a sub-side inter-device communication unit; and
    a sub-electronic device including:
        the sub-side inter-device communication unit configured to communicate with the main-side inter-device communication unit; and
        the sub-side HTTP server configured to provide a sub-side page to which the sub-side switching URL used to switch the connection is assigned, the sub-side page comprising a Web page of the sub-electronic device, wherein the main-side inter-device communication unit is configured to communicate with the sub-electronic device.

2. The device information providing system according to claim 1, wherein the main-side communication control unit is further configured to notify the information processing device of the sub-side switching URL in response to a request received from the information processing device while the main-side normal connection is established.

3. The device information providing system according to claim 1, wherein:
    the main-side page has a main-side switching URL assigned thereto, the main-side switching URL being used to switch the connection; and
    the main-side communication control unit is further configured to: (i) disconnect the main-side transfer connection when a connection to the main-side switching URL is requested by the information processing device while the main-side transfer connection is established, and (ii) establish the main-side normal connection.

4. The device information providing system according to claim 1, wherein:
    the sub-electronic device further comprises:
        a sub-side external communication unit configured to communicate with the information processing device; and
        a sub-side communication control unit configured to control communications;
    the main-side page has a main-side switching URL assigned thereto, the main-side switching URL being used to switch the connection; and
    the sub-side communication control unit is further configured to: (i) disconnect a sub-side normal connection between the information processing device and the sub-side HTTP server via the sub-side external communication unit when a connection to the main-side switching URL is requested by the information processing device while the sub-side normal connection is established, and (ii) establish a sub-side transfer connection between the information processing device and the main-side HTTP server via the sub-side external communication unit, the sub-side inter-device communication unit, and the main-side inter-device communication unit.

5. The device information providing system according to claim 4, wherein the sub-side communication control unit is further configured to notify the information processing device of the main-side switching URL in response to a request received from the information processing device while the sub-side normal connection is established.

6. The device information providing system according to claim 4, wherein the sub-side communication control unit is further configured to: (i) disconnect the sub-side transfer connection if the connection to the sub-side switching URL is requested by the information processing device while the sub-side transfer connection is established, and (ii) establish the sub-side normal connection.

7. The device information providing system according to claim 4, wherein the sub-side page further comprises a Web page for network setting of the sub-electronic device.

8. The device information providing system according to claim 7, wherein:
    the main-side external communication unit is configured to be used for wired communications; and
    the sub-side external communication unit is configured to be used for wireless communications.

9. The device information providing system according to claim 7, wherein:
    the main electronic device further comprises the image forming apparatus; and
    the sub-electronic device further comprises a network interface card that is detachable and attachable to the image forming apparatus.

10. An electronic device, comprising:
    a main-side external communication unit configured to communicate with an information processing device;
    a main-side inter-device communication unit;
    a main-side HTTP server configured to provide a main-side page including a Web page of the electronic device;
    a main-side communication control unit configured to disconnect a main-side normal connection between the information processing device and the main-side HTTP server via the main-side external communication unit when a connection to a sub-side switching URL is requested by the information processing device while the main-side normal connection is established, and establish a main-side transfer connection between the information processing device and a sub-side HTTP server via the main-side external communication unit, the main-side inter-device communication unit, and a sub-side inter-device communication unit; and
    an interface configured to be connected to a sub-electronic device including:

the sub-side inter-device communication unit configured to communicate with the main-side inter-device communication unit; and the sub-side HTTP server configured to provide a sub-side page to which the sub-side switching URL used to switch the connection is assigned, the sub-side page including a Web page of the sub-electronic device.

11. The electronic device according to claim 10, wherein the main-side communication control unit is further configured to notify the information processing device of the sub-side switching URL in response to a request received from the information processing device while the main-side normal connection is established.

12. The electronic device according to claim 10, wherein:
the main-side page has a main-side switching URL assigned thereto, the main-side switching URL being used to switch the connection; and
the main-side communication control unit is further configured to disconnect the main-side transfer connection if a connection to the main-side switching URL is requested by the information processing device while the main-side transfer connection is established, and establish the main-side normal connection.

13. The electronic device according to claim 10, wherein: the sub-electronic device further comprises:
a sub-side external communication unit configured to communicate with the information processing device; and
a sub-side communication control unit configured to control communications;
wherein the main-side page has a main-side switching URL assigned thereto, the main-side switching URL being used to switch the connection; and
wherein the sub-side communication control unit is further configured to:
(i) disconnect a sub-side normal connection between the information processing device and the sub-side HTTP server via the sub-side external communication unit when a connection to the main-side switching URL is requested by the information processing device while the sub-side normal connection is established, and
(ii) establish a sub-side transfer connection between the information processing device and the main-side HTTP server via the sub-side external communication unit, the sub-side inter-device communication unit, and the main-side inter-device communication unit.

14. The electronic device according to claim 13, wherein the sub-side communication control unit is further configured to notify the information processing device of the main-side switching URL in response to a request received from the information processing device while the sub-side normal connection is established.

15. The electronic device according to claim 13, wherein the sub-side communication control unit is further configured to: (i) disconnect the sub-side transfer connection if the connection to the sub-side switching URL is requested by the information processing device while the sub-side transfer connection is established, and (ii) establish the sub-side normal connection.

16. A non-transitory computer-readable recording medium for storing a device information providing program executable by a computer processor of an electronic device connected to a sub-electronic device, the device information providing program code comprising:

a first program code for causing the computer to communicate with an information processing device via a main-side external communication unit;

a second program code for causing the computer to communicate with the sub-electronic device via a main-side inter-device communication unit;

a third program code for causing the computer to provide a main-side page including a Web page of the electronic device via a main-side HTTP server;

a fourth program code for causing, via a main-side communication control unit, the computer to disconnect a main-side normal connection between the information processing device and the main-side HTTP server via the main-side external communication unit when a connection to a sub-side switching URL is requested by the information processing device while the main-side normal connection is established, and establish a main-side transfer connection between the information processing device and a sub-side HTTP server via the main-side external communication unit, the main-side inter-device communication unit, and a sub-side inter-device communication unit; and a fifth program code for causing, via an interface connected to the sub-electronic device, the computer to be connected to the sub-electronic device including:
the sub-side inter-device communication unit for communicating with the main-side inter-device communication unit; and
the sub-side HTTP server for providing a sub-side page to which the sub-side switching URL used to switch the connection is assigned, the sub-side page including a Web page of the sub-electronic device.

17. The non-transitory computer-readable recording medium for storing the device information providing program executable by the computer processor of the electronic device connected to the sub-electronic device of claim 16, wherein the program code further comprises a sixth program code for causing the main-side communication control unit to notify the information processing device of the sub-side switching URL in response to a request received from the information processing device while the main-side normal connection is established.

18. The non-transitory computer-readable recording medium for storing the device information providing program executable by the computer processor of the electronic device connected to the sub-electronic device of claim 16, wherein:
the main-side page has a main-side switching URL assigned thereto, the main-side switching URL being used to switch the connection; and
the program code further comprises a sixth program code for causing the main-side communication control unit to: (i) disconnect the main-side transfer connection when a connection to the main-side switching URL is requested by the information processing device while the main-side transfer connection is established, and (ii) establish the main-side normal connection.

19. The non-transitory computer-readable recording medium for storing the device information providing program executable by the computer processor of the electronic device connected to the sub-electronic device of claim 16, wherein:
the sub-electronic device further comprises:
a sub-side external communication unit configured to communicate with the information processing device; and a sub-side communication control unit configured to control communications;

the main-side page has a main-side switching URL assigned thereto, the main-side switching URL being used to switch the connection; and the program code further comprises sixth program code for causing the sub-side communication control unit to: (i) disconnect a sub-side normal connection between the information processing device and the sub-side HTTP server via the sub-side external communication unit when a connection to the main-side switching URL is requested by the information processing device while the sub-side normal connection is established, and (ii) establish a sub-side transfer connection between the information processing device and the main-side HTTP server via the sub-side external communication unit, the sub-side inter-device communication unit, and the main-side inter-device communication unit.

20. The non-transitory computer-readable recording medium for storing the device information providing program executable by the computer processor of the electronic device connected to the sub-electronic device of claim 19, wherein the program code further comprises a seventh program code for causing the sub-side communication control unit to notify the information processing device of the main-side switching URL in response to a request received from the information processing device while the sub-side normal connection is established.

* * * * *